US007374313B2

(12) United States Patent
Cassarly et al.

(10) Patent No.: US 7,374,313 B2
(45) Date of Patent: May 20, 2008

(54) LUMINAIRE WITH IMPROVED LATERAL ILLUMINANCE CONTROL

(75) Inventors: William J. Cassarly, Wooster, OH (US); Thomas L. R. Davenport, Tucson, AZ (US); John M. Davenport, Middleburg Heights, OH (US); Chris H. Jenson, Twinsburg, OH (US)

(73) Assignees: Energy Focus, Inc., Solon, OH (US); Optical Research Associates, Pasadena, CA (US)

( * ) Notice: Subject to any disclaimer, the term of this patent is extended or adjusted under 35 U.S.C. 154(b) by 225 days.

(21) Appl. No.: 11/366,711

(22) Filed: Mar. 2, 2006

(65) Prior Publication Data

US 2007/0211488 A1 Sep. 13, 2007

(51) Int. Cl.
*F21V 8/00* (2006.01)
*F25D 27/00* (2006.01)
(52) U.S. Cl. .................. 362/257; 362/92; 362/560; 362/624; 362/626
(58) Field of Classification Search ........... 362/257, 362/92, 555, 560, 580, 612, 623, 624, 625, 362/626
See application file for complete search history.

(56) References Cited

U.S. PATENT DOCUMENTS

| 3,497,981 A | 3/1970 | Tyne |
| 3,535,018 A | 10/1970 | Vasilatos |
| 4,585,298 A | 4/1986 | Mori |
| 4,765,701 A | 8/1988 | Cheslak |
| 4,907,132 A | 3/1990 | Parker |
| 5,036,435 A | 7/1991 | Tokuda et al. |
| 5,222,795 A | 6/1993 | Hed |
| 5,307,245 A | 4/1994 | Myers et al. |
| 5,312,569 A | 5/1994 | Mezei |
| 5,312,570 A | 5/1994 | Halter |
| 5,499,912 A | 3/1996 | Mezei |

(Continued)

OTHER PUBLICATIONS

Photograph of light pipe shown at the following two exhibitions: (1) Defense Advanced Research Projects Agency (DARPA), attended by military—and military contractors, Mar. 9-11, 2004 (DARPA) (2) Light Fair, Las Vegas, Nevada, attended by the public, Mar. 31-Apr. 2, 2004.

(Continued)

*Primary Examiner*—Sharon E Payne
(74) *Attorney, Agent, or Firm*—Charles E. Bruzga; Bruzga & Associates

(57) ABSTRACT

A luminaire with improved lateral illuminance control comprising a light pipe with a longitudinal center is disclosed. A light-extraction means applied to a radial swath of the light pipe has a longitudinal portion having dimension along its length, centered about a slice on the light pipe longitudinally; said slice being orthogonal to the longitudinal center and located in a propagation plane through which light propagates to a virtual target area intersecting the propagation plane. The light pipe intervenes between the radial swath and the target area. A first average efficiency point of the light-extraction means corresponds to the minimum distance to the target area being at least approximately 20% less than a respective, second average efficiency point corresponding to a respective maximum distance to such area. The light-extraction means efficiency varies from the first average efficiency point to the second average efficiency point though more than one non-zero value.

45 Claims, 27 Drawing Sheets

U.S. PATENT DOCUMENTS

| | | |
|---|---|---|
| 5,857,761 A | 1/1999 | Abe et al. |
| 5,903,695 A | 5/1999 | Zarian et al. |
| 5,982,969 A | 11/1999 | Sugiyama et al. |
| 5,987,199 A | 11/1999 | Zarian et al. |
| 6,039,553 A | 3/2000 | Lundin et al. |
| 6,095,673 A | 8/2000 | Goto et al. |
| 6,169,836 B1 | 1/2001 | Sugiyama et al. |
| 6,179,434 B1 * | 1/2001 | Saraiji .................... 362/125 |
| 6,215,947 B1 | 4/2001 | Abramowicz et al. |
| 6,278,827 B1 | 8/2001 | Sugiyama et al. |
| 6,282,355 B1 | 8/2001 | Zarian et al. |
| 6,289,150 B1 | 9/2001 | Zarian et al. |
| 6,488,397 B1 | 12/2002 | Masutani et al. |
| 6,563,993 B1 | 5/2003 | Imamura et al. |
| 6,577,794 B1 | 6/2003 | Currie et al. |
| 6,597,834 B1 | 7/2003 | Hata |
| 6,621,973 B1 | 9/2003 | Hoffman |
| 6,637,924 B2 | 10/2003 | Pelka et al. |
| 6,726,341 B2 | 4/2004 | Pashley et al. |
| 6,783,269 B2 | 8/2004 | Pashley et al. |
| 2002/0159741 A1 | 10/2002 | Graves et al. |

OTHER PUBLICATIONS 4 pages entitled "Uniglo Backlighting" from http://www.poly-optical.com/uniglo.html webpage—(viewed on May 2, 2004) showing uniform extraction of light from a light guide—admitted as prior art.

2 pages entitled "Design of Luxaura Light Guide" from http://www.luxaura.com/tech.shtml website—(viewed on May 2, 2004) showing emitting light in a radial swath—admitted as prior art.

US 6,419,383, 07/2002, Lundin (withdrawn)

* cited by examiner

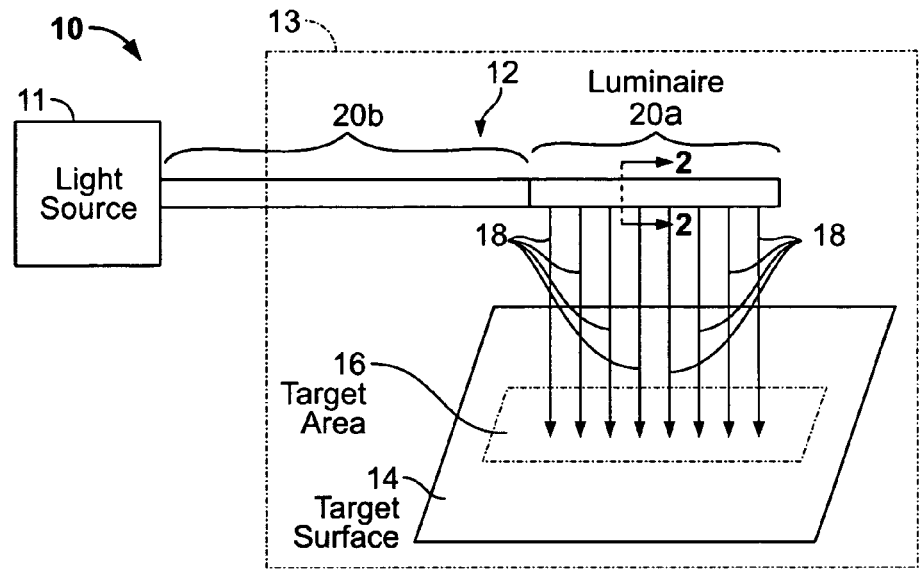
FIG. 1
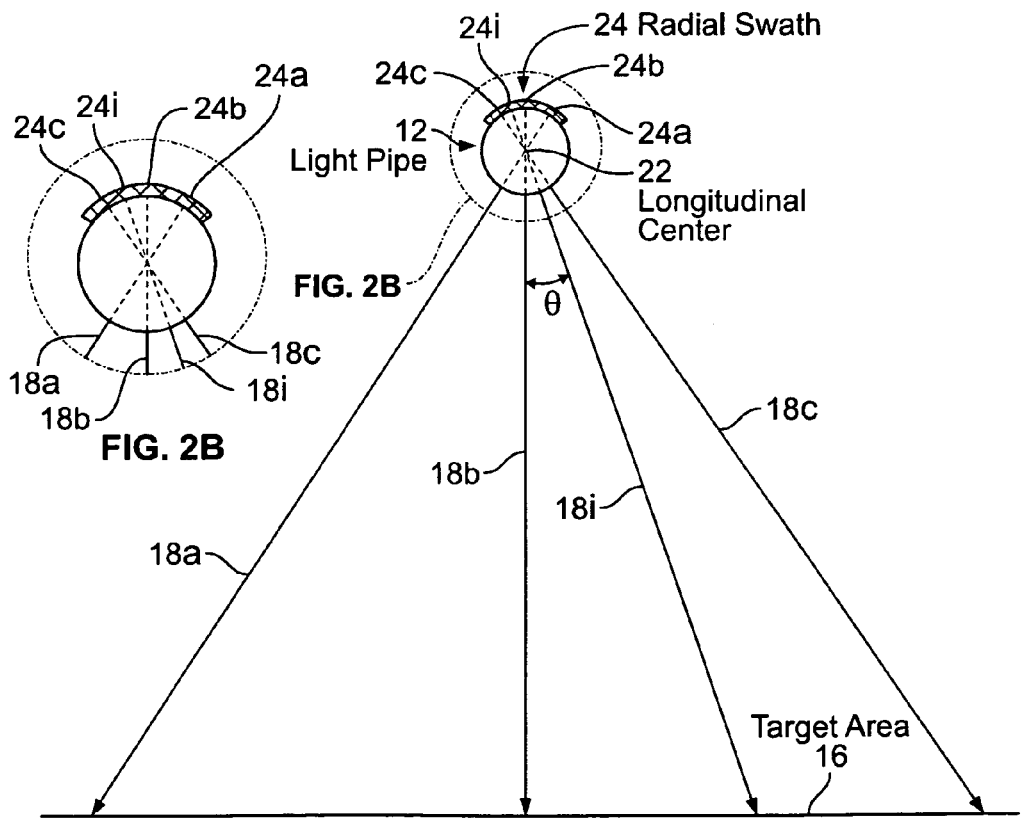
FIG. 2B
FIG. 2A

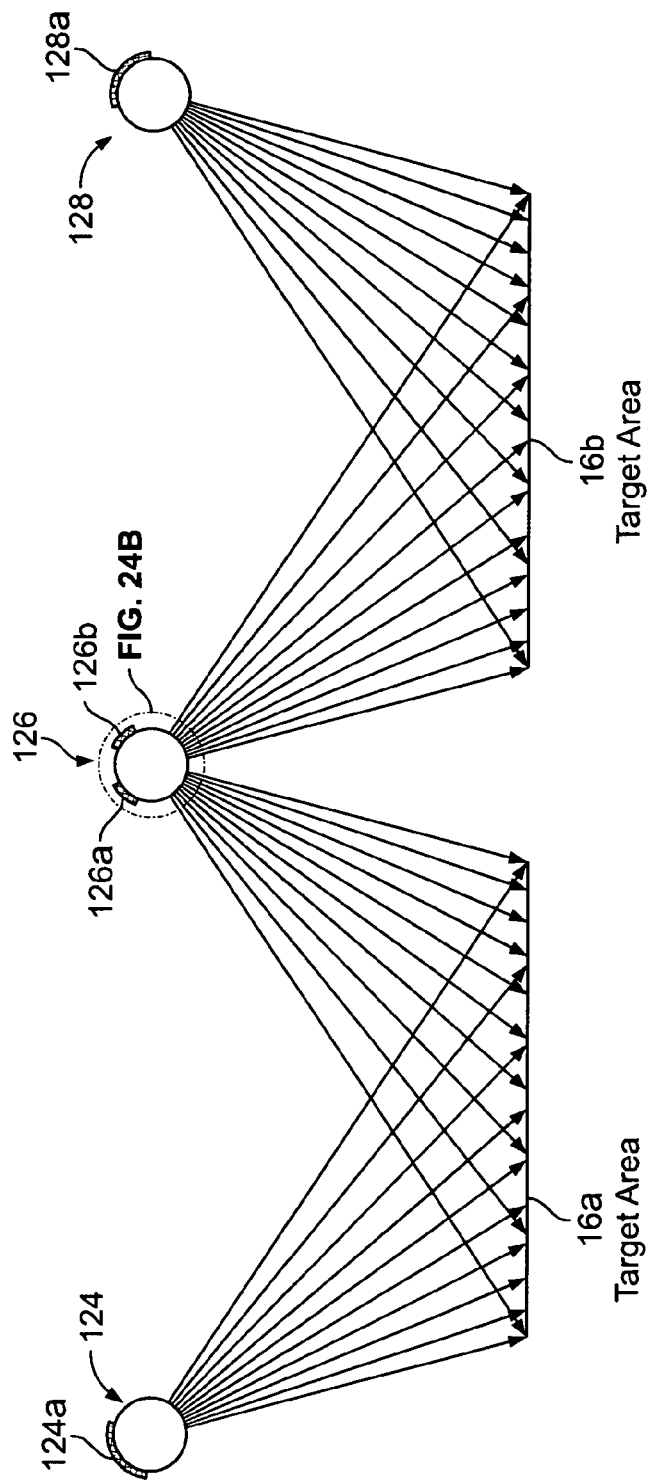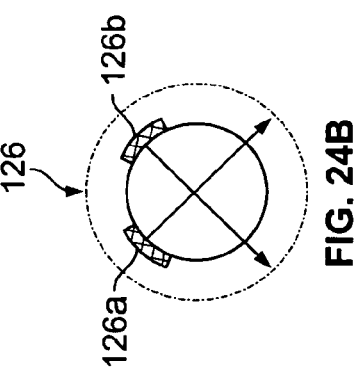

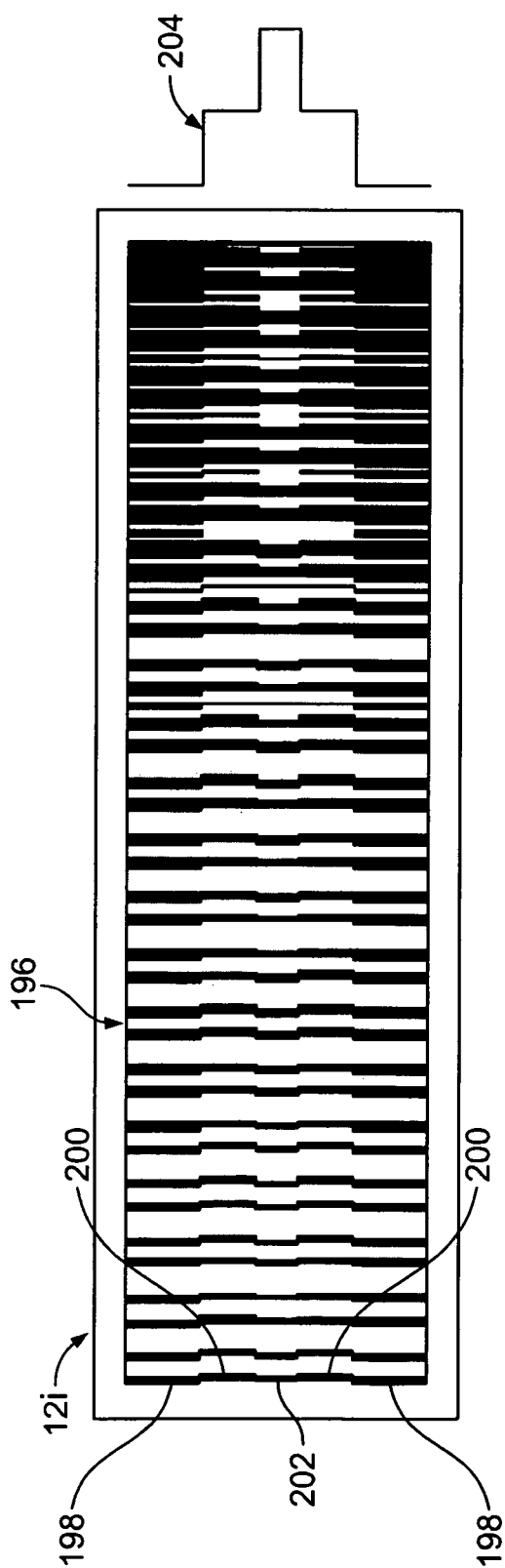
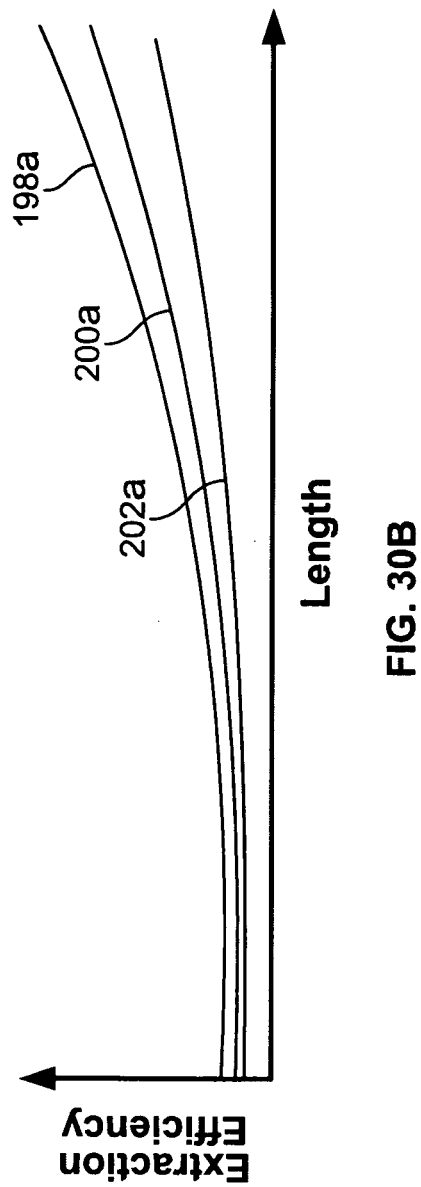
FIG. 30A
FIG. 30B

LUMINAIRE WITH IMPROVED LATERAL ILLUMINANCE CONTROL

FIELD OF THE INVENTION

The present invention relates to luminaires comprising light pipes in which light is extracted from the side of the light pipe in a directional manner. In addition, the invention relates to extraction of light from the side of light pipes in a manner that achieves improved lateral illuminance control.

BACKGROUND OF THE INVENTION

Light pipes are primarily used for lighting in two main modes. In an end-light mode, the light pipe is optimized to carry light along its length, and transmit it to the output face of the light pipe, typically to a lighting fixture. In a side-light mode, light is extracted from the side of the light pipe and provides illumination along its length. Light pipes with a hybrid combination of end-light and side-light are also used. The portion of a light pipe from which light is extracted from the side of the light pipe is referred to herein as a "luminaire." Luminaires can be integrated with end-light mode light pipe systems, or luminaires can be directly coupled to a source.

It would be desirable to provide a side-light emitting light pipe, having light-extraction means arranged to yield improved control of lateral illuminance distributions.

SUMMARY OF THE INVENTION

In accordance with one form of the invention, a luminaire with improved lateral illuminance control is provided, which comprises a light pipe with a longitudinal center. A light-extraction means applied to a radial swath of the light pipe having a longitudinal portion with a dimension along the length of the light pipe that is centered about a slice of the light pipe; said slice being orthogonal to the longitudinal center, and being located in a propagation plane through which light propagates to a virtual target area that intersects the propagation plane; the light pipe intervening between the radial swath and the target area. The light pipe includes a first average efficiency point of the light-extraction means in the radial swath corresponding to the minimum distance to the target area and a second average efficiency point of the light-extraction means in the radial swath corresponding to a respective maximum distance to the target area. The light-extraction means at the first average efficiency point being at least approximately a predetermined percentage less than the light-extraction means at the second average efficiency point, the predetermined percentage being 20. The efficiency of the light-extraction means in the radial swath varies from the first average efficiency point to the second average efficiency point though more than one non-zero value.

The foregoing side-light emitting light pipe beneficially includes light-extraction means arranged to yield improved control of lateral illuminance distributions.

The light-extraction means can be positioned to illuminate target areas directly below the luminaire, off to the side of the luminaire, or even multiple different areas. Multiple luminaires can be used together to illuminate a common area. This type of illuminance control can be used in applications that include, but are not limited to, freezer cases, cove lighting, wall washers, signage, and backlighting.

In a typical freezer case, the source is placed inside of the freezer. This produces an additional heat load that the freezer case must cool. By placing the luminaire inside of a freezer case and the source outside of the freezer case, the heat load is reduced and significant energy savings can be obtained. Additional savings are found because a lower power cooler can be used.

BRIEF DESCRIPTION OF THE DRAWINGS

FIG. 1 is a simplified, schematic side view of a sidelight illumination system according to the present invention.

FIG. 2A is a cross section of a luminaire of FIG. 1 taken at Arrows 2-2 in FIG. 1, showing light rays projecting towards a target area, and FIG. 2B is an enlarged detail view taken at a circle marked FIG. 2B in FIG. 2A.

FIG. 24A is a cross-sectional view of three laterally adjacent light pipes, with the central light pipe having multiple, separate light-extraction swath patterns; and FIG. 24B is an enlarged detail view taken at a circle marked FIG. 24B in FIG. 24A.

FIG. 30A shows a top view of a light pipe with a still further pattern of light-extraction means according to the invention.

FIG. 30B is a graph showing efficiency of light-extraction means along the length of the light pipe of FIG. 30A.

DETAILED DESCRIPTION OF THE PREFERRED EMBODIMENTS

Figures 3A, 3B:
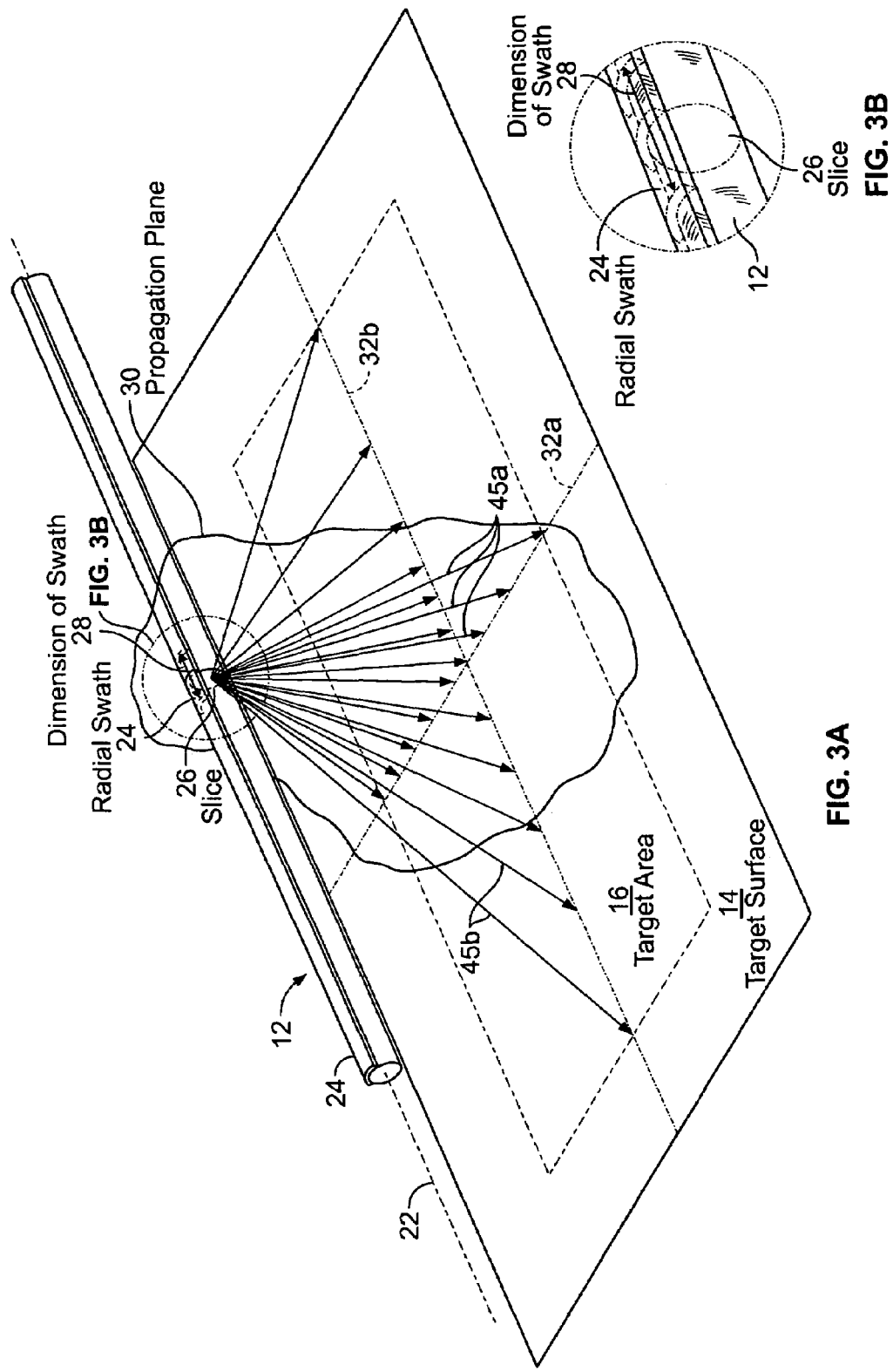
FIG. 3A is an upper perspective view of a longitudinal section of the luminaire of FIG. 1.
FIG. 3B is an enlarged detail view taken at a circle marked FIG. 3B in FIG. 3A.

This description discusses the topics of (1) general considerations, (2) practical implementations of patterns for light-extraction means, and (3) miscellaneous considerations.

1. General Considerations

FIG. 1 shows a sidelight illumination system 10, illustrating the principle of extracting light from the side of a light pipe. System 10 includes a light source 11, a light pipe 12, and a target surface 14 subsuming a target area 16 to be illuminated. As used herein, "target area" comprises a subset of a "target surface." Target surface 14 may be planar, as shown, or may have other shapes, such as curved. Arrows 18 show directional illumination of target surface 14 from a region 20a of light pipe 12 that emits light from the side of the light pipe. Side-light emitting region 20a is referred to herein as a "luminaire." Section 20a may comprise a fraction of the length of light pipe 12 that is optimized to provide side light extraction, with some or all of the remaining section(s) (e.g., region 20b) of the light pipe 12 optimized to transmit light along the longitudinal axis of the light pipe. In some embodiments, section 20b can be removed and the light source directly coupled into the luminaire section. In other embodiments, light from the source can be split into multiple outputs, each of which provides light for different luminaires. In still further embodiments, multiple sources can be combined to illuminate a single luminaire.

In one preferred embodiment, light source 11 is placed outside of a container represented by phantom-line box 13. Container 13 may be an enclosed or open refrigerated container. For instance, container 13 may be an enclosed freezer case for displaying food or other items.

FIG. 2 shows a light pipe 12 and a longitudinal center 22 of light pipe 12. A radial swath 24 of light-extraction means (sometimes abbreviated as "light-extraction means 24") is shown schematically and with an arbitrary cross hatching. Examples of preferred light-extraction means are described below. Whereas light rays (not shown) may exit light-extraction means 24 in any direction, typically a majority of light rays (e.g., rays 18a, 18b, 18i, and 18c) pass in a preferential direction, through the light pipe, reaching target area 16. Generally, the light rays emitted from the light-extraction means correspond to an originating point (e.g., points 24a, 24b, 24i, and 24c) of radial swath 24. An extractor angle θ—preferred to in connection with other figures in this specification—is shown between light rays 18b and 18i. Light ray 18b is oriented vertically downward towards, and orthogonal to, target area 16, while covering the shortest distance to target area 16 from longitudinal center 22 of light pipe 12, and light ray 18i is one of the numerous light rays originating from the light-extraction means and chosen to define angle θ. The corresponding origin points for the light rays from the radial swath are chosen in such a manner so that there is an extension of radial swath 24 past the end of the outer origin points (e.g., 24a and 24c).

FIG. 3A, and especially detail FIG. 3B, show light pipe 12 with a radial swath 24. Light pipe 12 intervenes between radial swath 24 and target area 16. The light pipe has a "slice" 26. Slice 26 constitutes a sliver of the light pipe with zero width along the length of the light pipe. Slice 26 is orthogonal to longitudinal center 22 of the light pipe. A radial swath 24 of light-extraction means, having a dimension 28 along the length of the light pipe, is centered about slice 26; in other words, slice 26 is centered in radial swath 24 along longitudinal center 22. Slice 26 is located in a propagation plane 30 through which the light from the light pipe propagates to target area 16. Propagation plane 30 intersects target area 16 at a line 32a, which is where light rays 45a strikes the target area. Contrasting light rays 45b strike target surface 14 along a line 32b; rays 45b have lesser importance to the present invention than light rays 45a which strike the target area laterally, or cross-wise, to the length of the luminaire.

Figure 4:
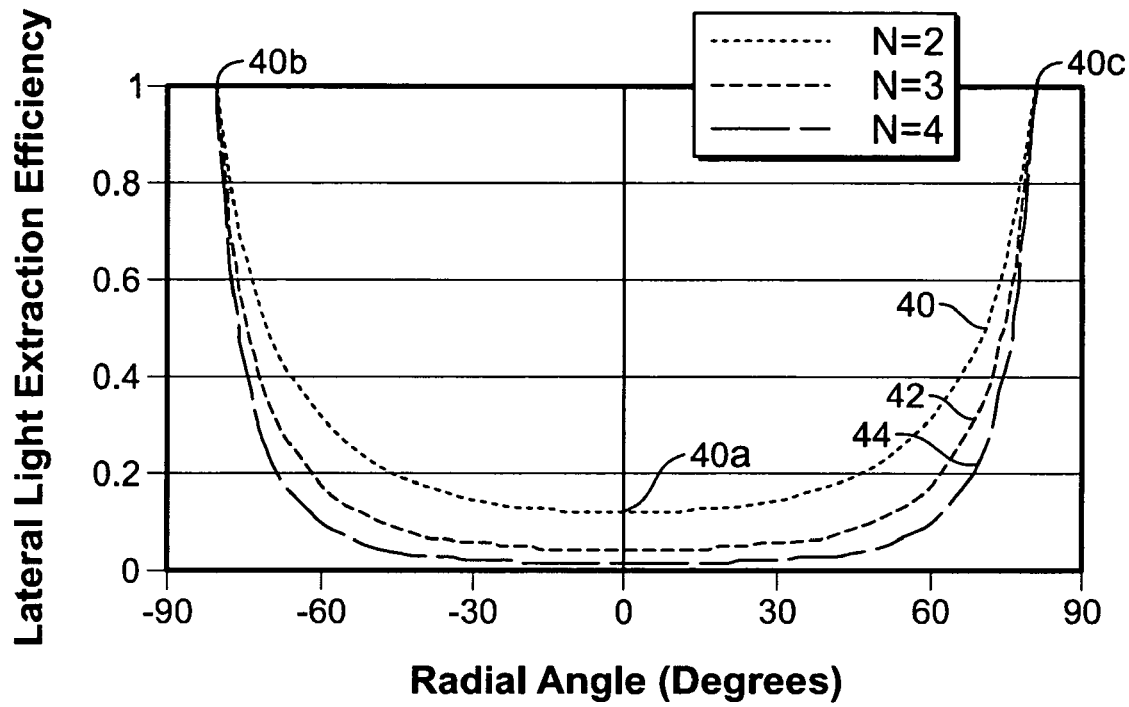
FIG. 4 is a graph comparing lateral efficiency of light-extraction means against different values of radial angles.

FIG. 4 shows various symmetric profiles of efficiency of light-extraction means (e.g., 24, FIG. 2) versus a radial angle θ (FIG. 2) between light rays 18b and 18c, each of which passes through longitudinal center 22. In curve 40, a point 40a represents a first average efficiency point of the light-extraction means, and points 40b and 40c represent respective, second average efficiency points of the light-extraction means. In this symmetric case, the lateral light extraction efficiency for points 40b and 40c is the same. As can be readily seen in FIG. 4, first average efficiency point 40a—which could be of zero efficiency value—is at least approximately a predetermined percentage less than second efficiency point 40b, where the predetermined percentage is 20%. The predetermined percentage could vary from 1%, to almost 100%, but for the range from 1% and 20%, the complexity of fabricating the variation in the radial swath might not be warranted. The required predetermined percentage depends upon the size and shape of the target area. As the width of the target area increases, the predetermined percentage increases and the tails in the resulting illuminance distribution become a smaller fraction of the light supplied by the luminaire. At a predetermined percentage of 50% the impact on the target illuminance is readily observed. When the predetermined percentage is 85% or more, as indicated in FIG. 4, for instance, the impact on the target illuminance is dramatic. Curves 42 and 44 show different profiles of light-extraction efficiency versus radial angle, wherein the foregoing relation of first average efficiency point (not numbered) and respective second average efficiency points (not numbered) holds true.

Figure 5:
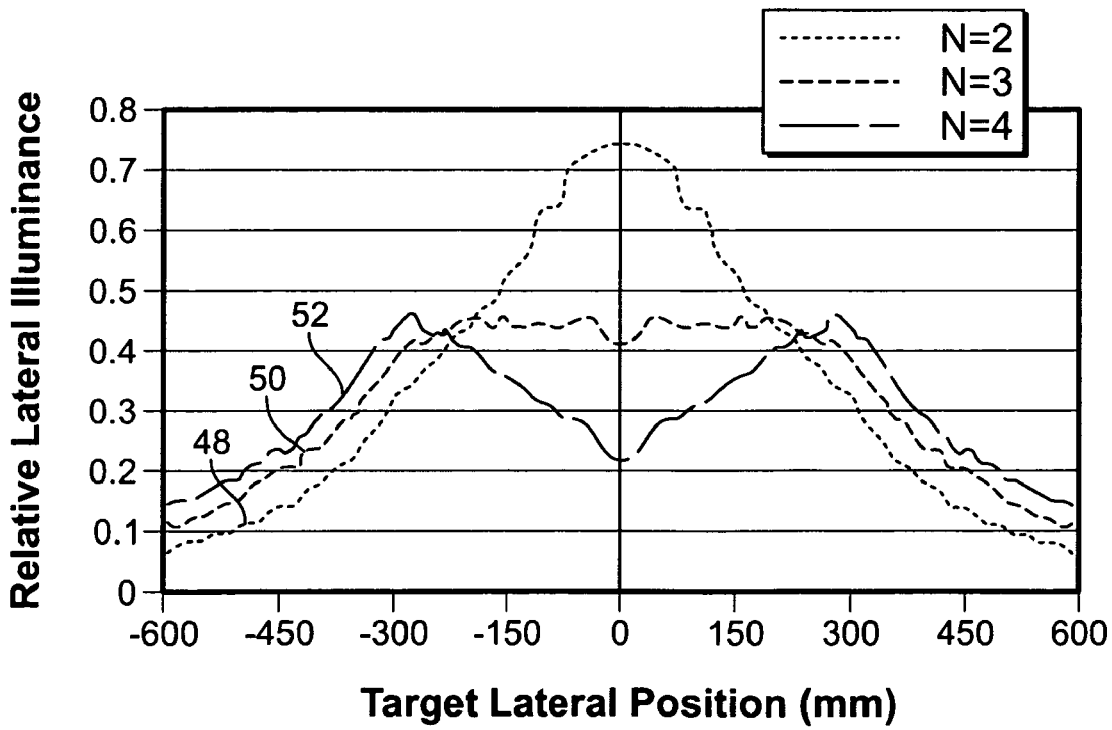
FIG. 5 is a graph comparing relative lateral illuminance from differently-varying-density, light-extraction means against lateral target position.

FIG. 5 compares relative lateral illuminance produced by the light-extraction means (e.g., 24, FIG. 2) against position on the target area (e.g., 16, FIG. 2). The illuminance predictions in FIG. 5 are computed using a Monte Carlo simulation with LightTools® software. LightTools® software is a commercially available illumination software package from Optical Research Associates of Pasadena, Calif.

In FIG. 5, the relative illuminance can vary depending upon the different light-extraction efficiency profiles of FIG. 4. For instance, relative lateral illuminance curve 48, with a peak at position 0, results from light-extraction efficiency curve 40 of FIG. 4. Similarly, relative lateral illuminance curve 50, which is substantially uniform or flat between −300 mm and +300 mm, results from light-extraction efficiency curve 42 of FIG. 4. Finally, relative lateral illuminance curve 52, with a dip at position 0 mm, results from light-extraction efficiency curve 44 of FIG. 4. "Substantially uniform" illuminance is meant to be changes which are typically imperceptible to the human eye and because of human eye perception, this can include changes up to about + or −50% when the changes occur slowly over the target area. The desired illuminance distribution for many applications is a substantially uniform distribution; however, uniform illuminance distributions, which are peaked or dipped, are also common. The profile for a substantially uniform illuminance can be adjusted when peaked or dipped distributions are desired. As required for a specific application, more or less extraction efficiency can be applied using the profile for a substantially uniform distribution as the starting point.

As can be appreciated from FIGS. 4 and 5, lateral illuminance uniformity shown in FIG. 5, is controlled by varying the profiles of light-extraction efficiency shown in FIG. 4.

Before discussing preferred patterns of light-extraction means below, we first present, background information relating to the specific case where the extraction means is of constant lateral efficiency. (In contrast, the present invention typically involves a gradient in efficiency of light-extraction means). Additionally, it is important to note that FIGS. 6-8 relate to luminous intensity, measured as amount of light energy per unit solid angle emitted from a light source. This differs from relative lateral illuminance (e.g., FIG. 5), measured as the amount of light energy reaching a unit area of target surface. When the target surface is a sufficiently large sphere, relative intensity and relative illuminance distributions are substantially equivalent.

Figure 6:
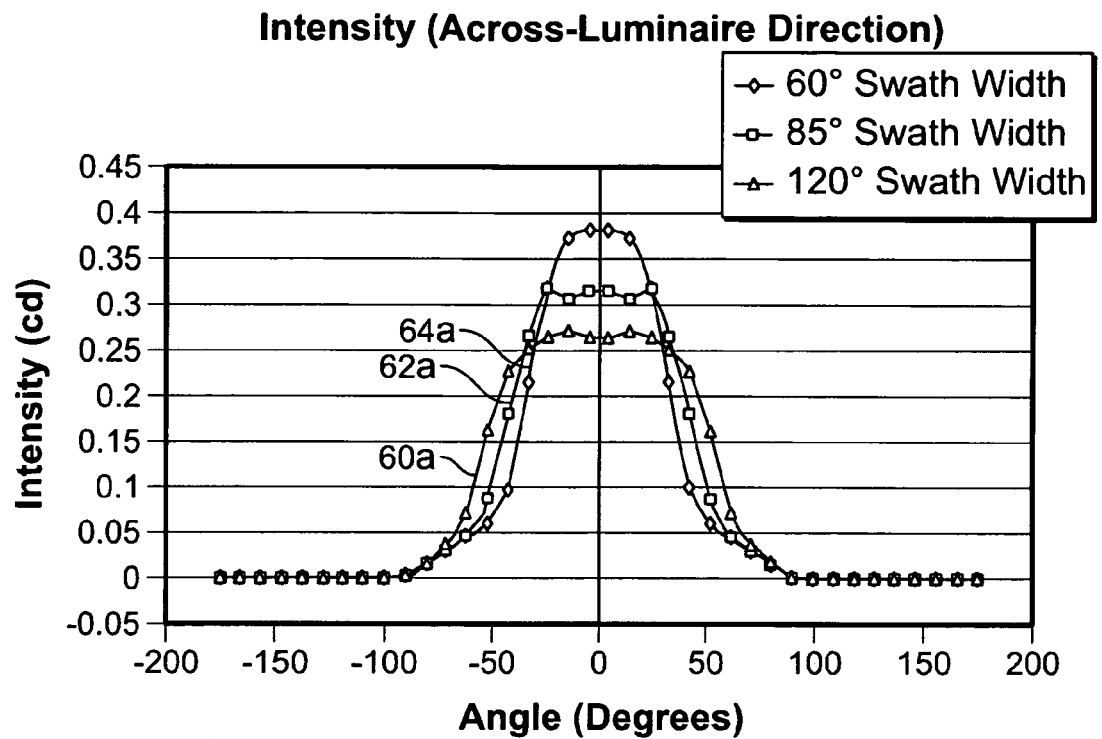
FIG. 6 is a graph comparing luminous intensity in the across-luminaire, or lateral, direction of light from a constant light-extraction means against a range of radial angles of such light.

FIG. 6 compares light intensity in the lateral or across-luminaire direction (e.g., rays 45a, FIG. 3A) emitted from the light-extraction means (e.g., 24, FIG. 3A) against a range of radial angles of light (e.g., θ, FIG. 2), for the case of constant efficiency of light-extraction means.

Among curves 60a, 62a and 64a in FIG. 6, curve 60a for a 120-degree swath width of light-extraction means ("swath") has the lowest height at position 0 degrees. Curve 62a for an 85-degree swath width has a higher peak than curve 60a at 0 degrees, and curve 64a for a 60-degree swath width has the highest peak among the three curves at 0 degrees.

Figure 7:
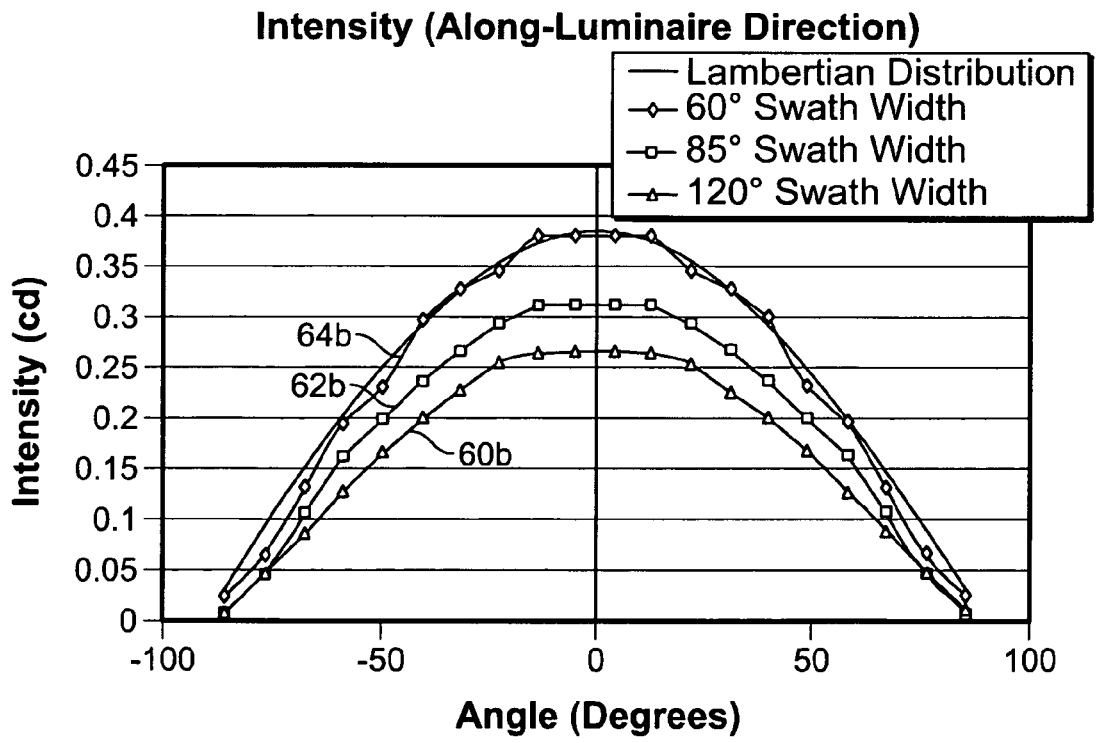
FIG. 7 is a graph comparing luminous intensity in the along-luminaire direction against a range of radial angles.

FIG. 7 shows light intensity in the along-luminaire direction for curves 60b, 62b and 64b. These curves correspond to curves 60a, 62a, and 64a (FIG. 6) and concern the same radial swath widths as curves 60a, 62a, and 64a.

FIG. 6 shows that light intensity of a luminaire is substantially uniform in the central angular region of the across-luminaire direction, and that the angular size of that central region depends upon the width of the radial swath (e.g., 24, FIG. 2) of constant light-extraction means. FIG. 7 shows that the luminous intensity is close to Lambertian in the along-luminaire direction.

Figure 8:
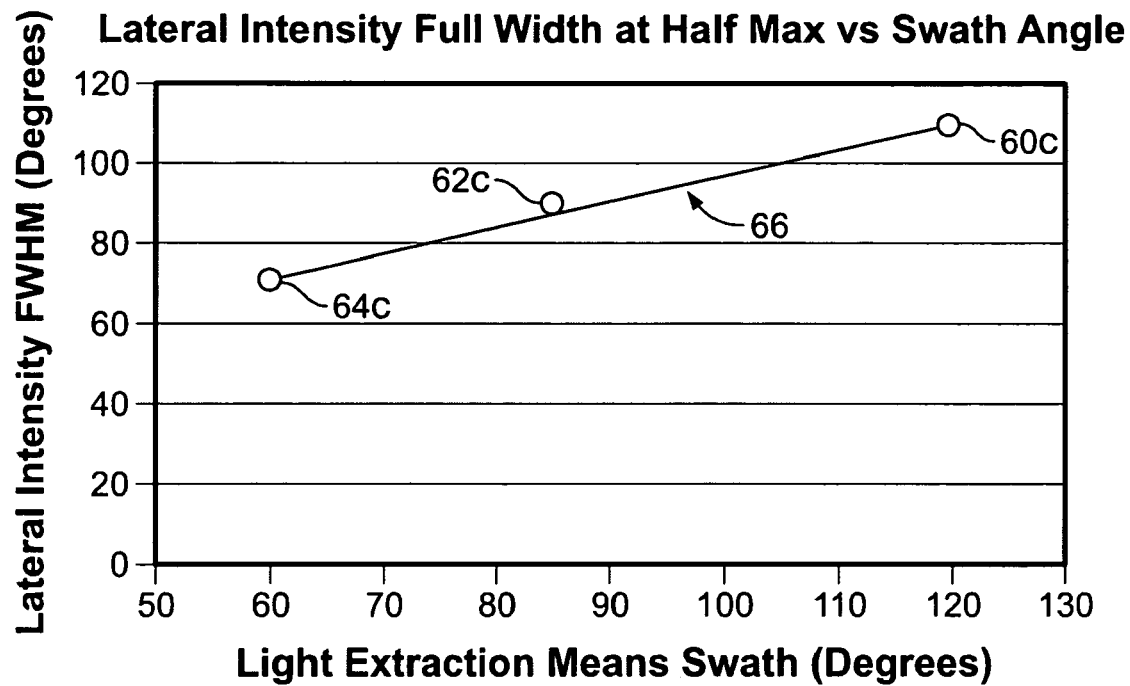
FIG. 8 is a graph comparing lateral intensity full width at half max versus swath width.

FIG. 8 compares lateral intensity full width at half max versus swath angle for points 60c, 62c and 64c. These points respectively relate to like-numbered curves 60a, 62a, and 64a of FIG. 6 Referring to FIG. 8, for constant light-extraction efficiency in the radial (or cross-luminaire) direction, the Intensity Full Width Half Max (FWHM) is linearly related to number of radial degrees of the swath of light-extraction means. Thus, FWHM is approximately the same as swath width. Changing the radial degrees of the swath changes the width of the intensity distribution as shown by line 66. But changing the radial degrees of the swath does little to control the shape of the distribution in the central region of the intensity distribution. This can be understood by observing that all three curves 60a, 62a, and 64a in FIG. 7 have flat central regions. FIG. 6 also shows that there is a fall-off region that occurs between the flat central region and where the intensity reaches a value of zero.

Now, considering light-extraction means 24 of FIG. 2A, embodied with an across-luminaire efficiency gradient, in accordance with the invention, consider the following case: most of the target area (1) is both in the far field of the short axis of the luminaire (>5 times the short-axis dimension), and (2) in the near field of the long axis of the luminaire (<<5 times the long axis dimension). Lighting systems can be created wherein single ended or double ended luminaires are placed in a linear path. Such a configuration allows the distance from one luminaire to be in the far field of that luminaire but still be in the near field of the assembly of luminaires. In various configurations, the source, such as an LED, can be integrated into the light guide to make a single long luminaire with improved lateral illuminance control.

Further considering FIG. 2A, assuming the diameter of light pipe 12 is small compared to the distance to the target, illuminance (E) is related to intensity (I) through a $\cos^3$ relationship (where "cos" means "cosine"), according to the following equations.

Equation 1:

$$E = \frac{I\cos^3(\theta)}{d^2}$$

Equation 2:

$$I = \frac{Ed^2}{\cos^3(\theta)}$$

To uniformly illuminate a planar target surface, constant light intensity in the across-luminaire direction is the incorrect criterion to provide substantially uniform illuminance. Instead, light intensity with a roughly 1/cos³ relationship can provide substantially uniform illuminance in typical cases with a planar target surface, for instance. This intensity distribution can be achieved by using a light-extraction means (e.g., pattern of paint with $TiO_2$ particles) with a gradient in the radial, or cross-luminaire, direction.

Figure 9A:
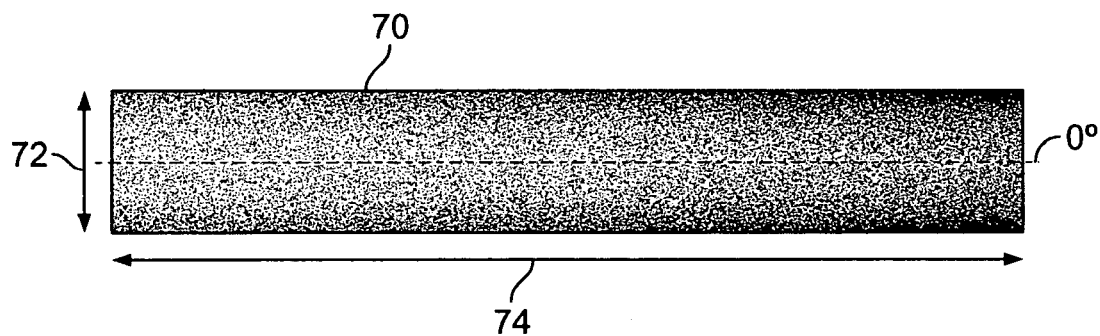
FIG. 9A is a top view of an exemplary light-extraction means of the light pipe of FIG. 1.

FIG. 9A shows an exemplary light-extraction means 70 of a light pipe (e.g., 12, FIG. 2), portraying only the light-extraction means from a view looking down at the light pipe. Light-extraction means 70 has a smoothly varying efficiency gradient in radial swath direction 72 and also a smoothly varying efficiency gradient in the length, or along-luminaire, direction 74. In the radial swath direction, angular separation between individual extractors, or "dots", in means 70 is much less than 20 degrees. The present invention is primarily concerned with efficiency gradients in radial swath direction 72, but those radial efficiency gradients can be combined with efficiency gradients in along-luminaire direction 74. Typical representations of smoothly varying radial efficiency gradients are shown in FIG. 4 as curves 40, 42 and 44. Although FIG. 9A shows many separate points of light-extraction means 70, the illuminance distribution produced by the light-extraction means typically is measured at a target surface (not shown) that is in the far field of the short axis of the light pipe (i.e., >5× the short-axis dimension). Such spacing causes the aggregate illuminance contributions of the separate points of the light-extraction means to be spatially averaged; hence, a smoothly-varying density curve is a good representation of the effective density of the light extraction means.

Figure 9B:
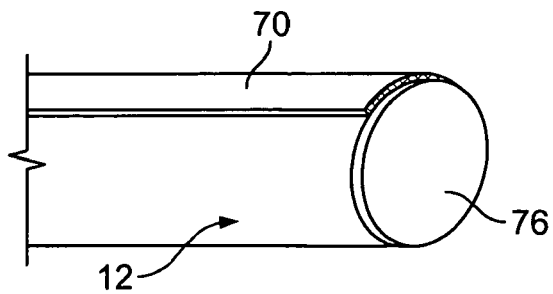
FIG. 9B is a side perspective view of the right-hand end of a light pipe having the light-extraction means of FIG. 9A.

FIG. 9B shows an end of a light pipe 12 that is not connected to a light source, having light-extraction means 70 on top of the light pipe. A mirror 76 is attached to the illustrated end of the light-pipe, for reflecting back into the light pipe, light that otherwise would exit the end of the light pipe and be wasted. Mirrors can be employed for other embodiments of the invention.

Figure 10:
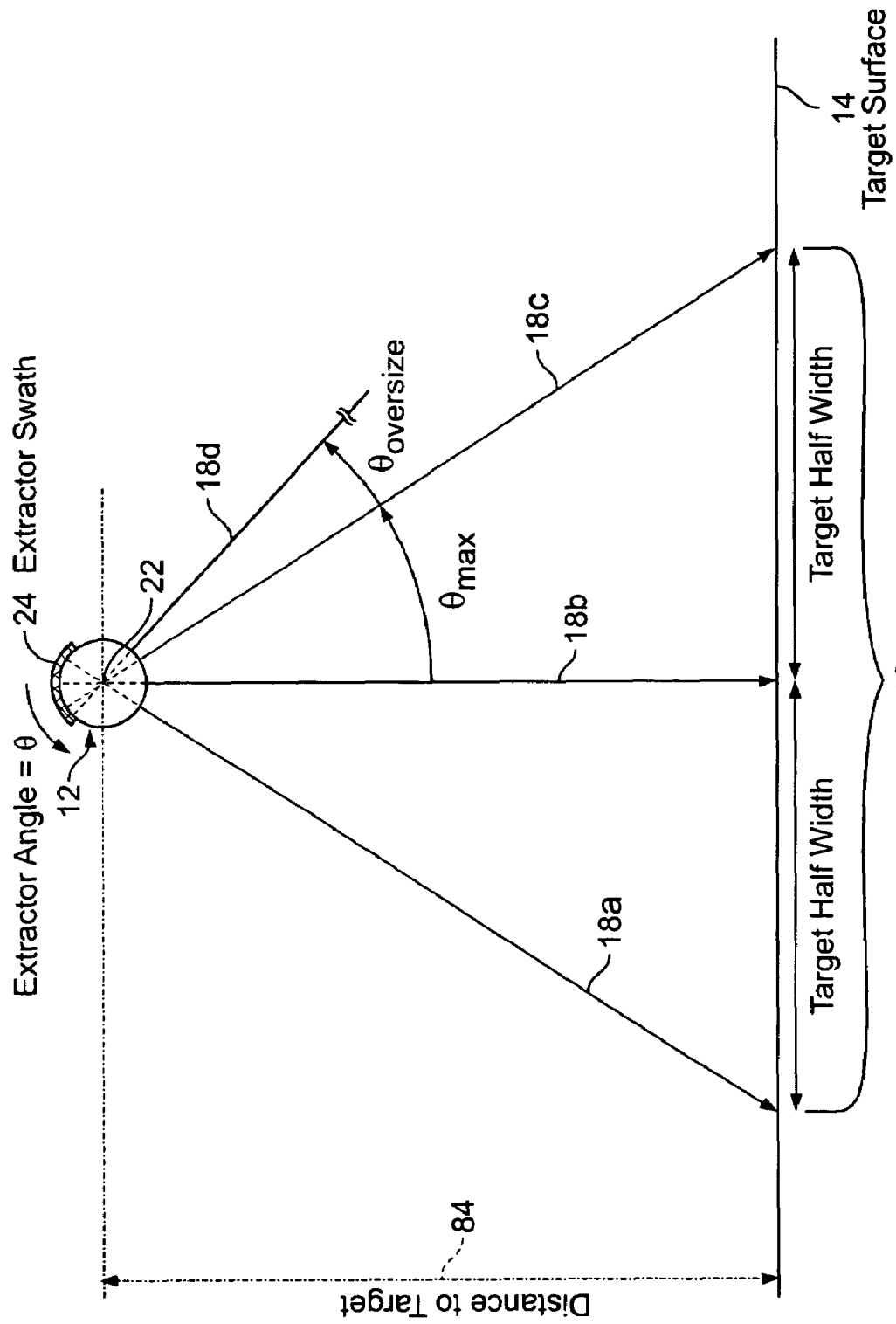
FIG. 10 is similar to FIG. 2, but shows additional parameters to aid in explaining preferred light-extraction means.

In FIG. 10, the majority of light rays (e.g. rays 18a, 18b, and 18c) pass in a preferential direction, through light pipe 12, reaching target area 16. Light ray 18b, which is oriented vertically downwards towards, and orthogonal to, target area 16, covers the shortest distance 84 from longitudinal center 22 of the light pipe to the target area. Light rays 18a and 18c cover the farthest distances from longitudinal center 22 of the light pipe to the target area over which a given illumination distribution is desired, forming a corresponding angle (e.g., $\theta_{max}$) with light ray 18b. The angle between rays 18a and 18b, or between rays 18b and 18c, will be the maximum angle, $\theta_{max}$, between the shortest and the respective longest light rays from the light-extraction means falling on the target area. The placement, composition and the extent of the radial swath is chosen in such a manner that the light rays from the light-extraction means fall on target surface 14 with a desired lateral illuminance. The lateral dimension of target area 16 is defined by the distance between points of contact of light rays 18a and 18c with the target area. For instance, the respective distances between the point of contact of light ray 18b and points of contact of light rays 18a and 18c with the target surface will produce equal and symmetric TargetHalfWidths—a variable discussed below, which cumulatively create the desired full width of target area 16.

Typically, a majority of light rays (e.g. 18a, 18b, and 18c) fall on desired target area 16, but for obtaining a desired lateral illuminance across the target area 16, radial swath 24 is slightly extended and oversized. This oversize allows the edges of the desired illuminance distribution to be prescribed, but also produces light outside of the target area (e.g. ray 18d). The light rays falling on target surface 14 beyond the width of target area 16 will be overshoot light rays from the light-extraction means with points of origin being in the oversize extension of radial swath 24 (e.g., generally to the right of point 24a in FIG. 2, and generally to the left of point 24c in that figure). An angle $\theta_{oversize}$ is shown between the farthest distance of light rays (e.g., ray 18d) falling towards the target area and light ray 18c at the outer edge of target area 16.

The radial angle $\theta_{oversize}$ between light rays 18c and 18d occurs because a round light pipe does not image the light rays from the light-extraction means directly onto the desired target area. Instead, blurred images of light extraction regions are created at the target surface. The shape of the light pipe can be changed to increase or decrease the amount of image blurring.

The efficiency profile of the light-extraction means versus a radial angle θ (e.g., θ, FIG. 2) will result in smoothly varying efficiency profiles (e.g. FIG. 4). The following equation can provide a desired control of lateral illuminance uniformity for $-\theta_{max}-\theta_{oversize}<\theta<\theta_{max}+\theta_{oversize}$.

Equation 3:

$$\text{Efficiency} = K \Big/ \cos^N\left[\theta \frac{\theta_{max}}{\theta_{max} + \theta_{oversize}}\right] + f(\theta)$$

wherein

Figure 11:
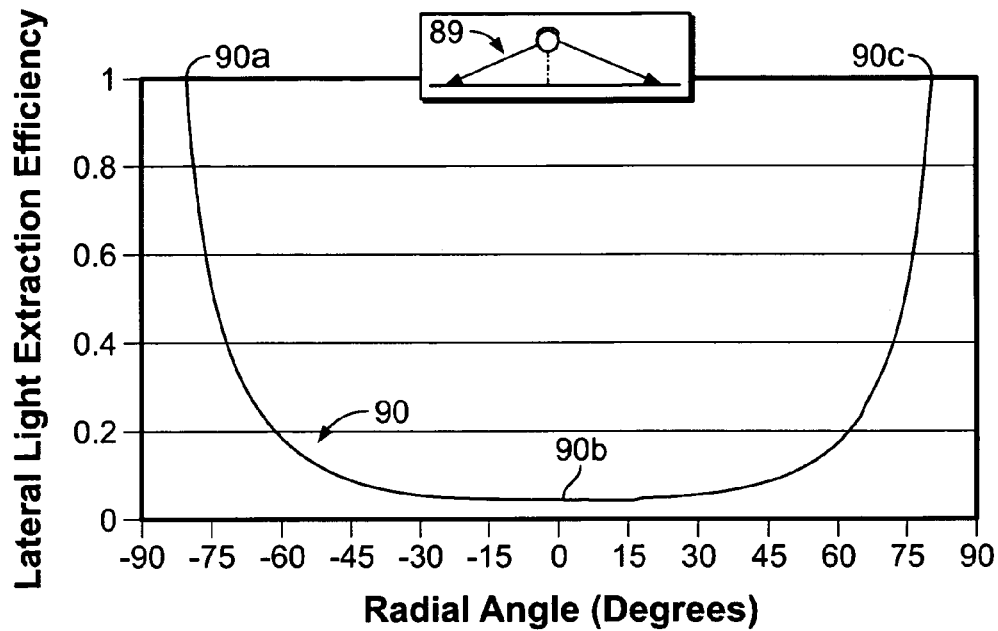
FIG. 11 is a graph comparing lateral efficiency of light-extraction means against different radial angle values.

K is a constant scale factor;

$\theta_{max}$ and $\theta_{oversize}$ are defined above in connection with FIG. 10; and f (θ) is a balancing factor;

$\theta_{oversize} \sim 11$ $\theta_{max} = |\text{atan (TargetHalfWidth/Distance\_to\_Target)}|$ $\theta_{min} = -\theta_{max}$ Scale factor K is adjusted along the longitudinal direction of the light pipe to provide longitudinal uniformity. The term "cos" means "cosine", and a shape factor N provides allows a degree of control. The terms "$\theta_{max}$" and "$\theta_{oversize}$" are shown in FIG. 10, for instance. The scale factor K remains constant with a varying value of N and θ resulting in smoothly varying efficiency profiles of the light-extraction means. Typically, the balancing factor f (θ) is 0 but can be tailored for specific applications. Most commonly, f (θ) is a correction term so that f(θ)/efficiency<0.5. The value of f (θ) can be adjusted for any addition or subtraction of extraction efficiency, in order to tailor the pattern of the efficiency profiles for a desired illuminance distribution FIG. 11 shows a profile of efficiency of light-extraction means (e.g., 24, FIG. 10) versus a radial angle (e.g. θ in FIG. 2) between a light ray (e.g. 18b in FIG. 10) that covers the shortest distance to the target area from longitudinal center 22 (FIG. 10) and a light ray (e.g. 18c in FIG. 10) that covers the farthest distance to the target area from longitudinal center 22 (FIG. 10). In curve 90, a point 90b represents a first average efficiency point of the light-extraction means, and points 90a and 90c represent respective second average efficiency points of the light-extraction means. The smooth profile of the light-extraction means results when the shape factor N remains constant while the radial angle θ has a variable value. As can be readily seen in FIG. 11, the pattern of the light-extraction means is laterally symmetric about 0 degrees so as to form a shape of a cross-sectional trough. A legend 89, based on the symmetrical arrangement of FIG. 10, shows that curve 90 relates to a symmetrical arrangement.

Figure 12:
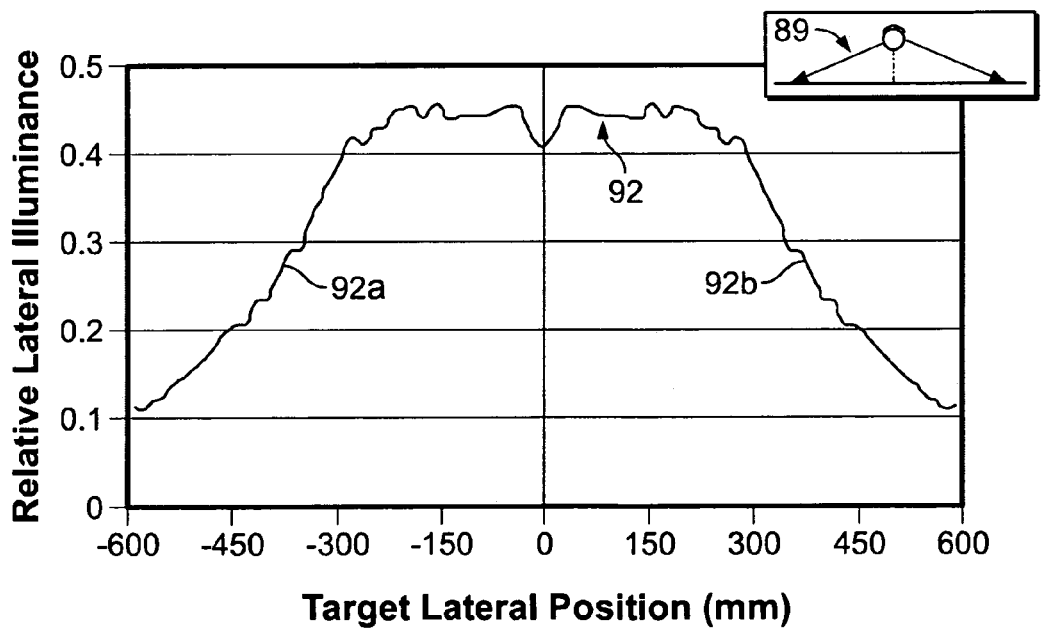
FIG. 12 is similar to FIG. 5 but shows a different curve.

FIG. 12 compares the relative lateral illuminance from the light-extraction means (e.g., 24, FIG. 2) against the position of light rays (e.g., 18a, 18b, 18c, FIG. 2) on the target area (e.g., 16, FIG. 2). The relative lateral illuminance depends upon the light-extraction efficiency profile of FIG. 11.

FIG. 12 shows variation of the relative lateral illuminance between −600 mm and 600 mm. The relative lateral illuminance, as shown by curve 92, is substantially uniform between −300 mm to 300 mm. However, below −300 mm and above 300 mm, curve 92 has so-called "tails" in the distribution of light. Legend 89, based on the symmetrical arrangement of FIG. 10, shows that curve 90 relates to a symmetrical arrangement.

For achieving a substantially uniform illuminance between −300 mm and 300 mm in FIG. 12, the following data applies to Equation 3 above:
Target Half Width=300 mm
Distance to Target=110 mm
Rod Diameter=19 mm
$\theta_{oversize}$=13 degrees
$(\theta_{max}+\theta_{oversize})$=82.9 degrees
N=3

Figure 13:
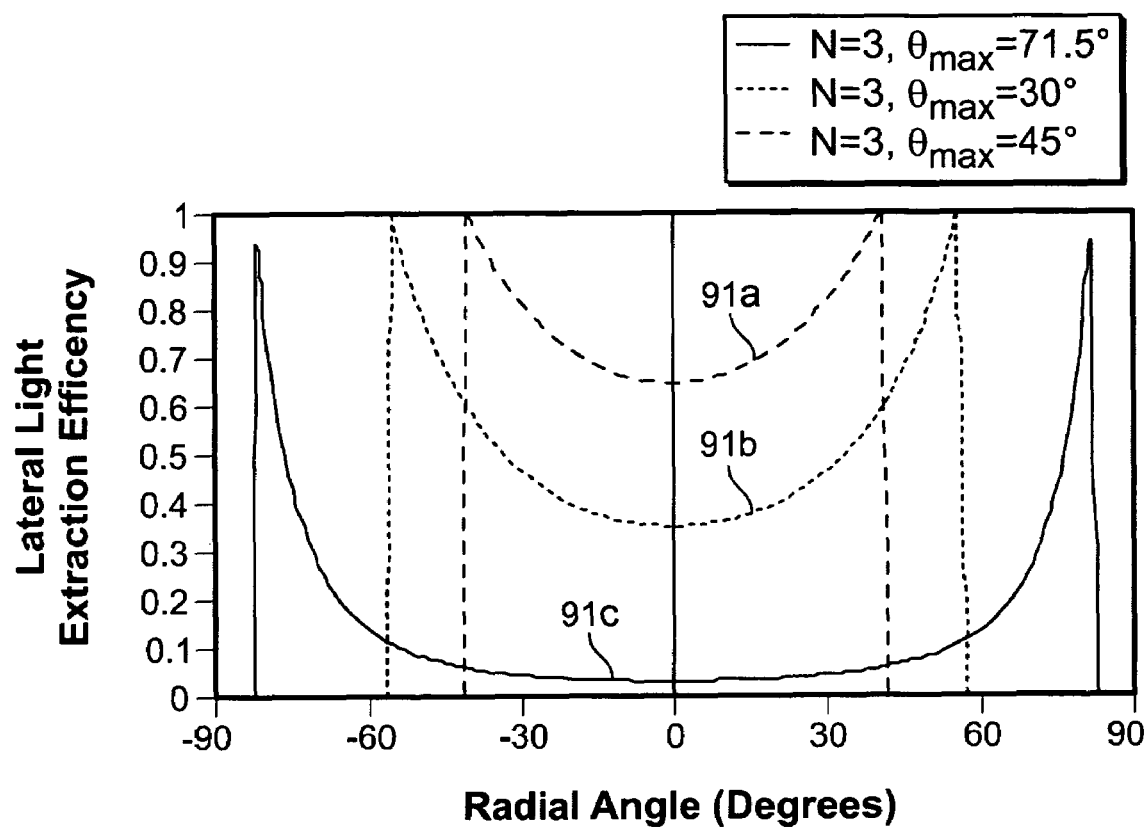
FIG. 13 is similar to FIG. 4, but shows extraction efficiency curves for different values of $\theta_{max}$ (Theta Max) such as shown in FIG. 10.

FIG. 13 shows an example of the variation in light extraction efficiency profiles due to varying $\theta_{max}$ (Theta Max) in Equation 3 above with $-\theta_{max}-\theta_{oversize}<\theta<\theta_{max}+\theta_{oversize}$. In FIG. 13, curve 91a relates to a $\theta_{max}$ of 30 degrees; curve 91b relates to a $\theta_{max}$ of 45 degrees; and curve 91c relates to a $\theta_{max}$ of 71.5 degrees. It can be observed from FIG. 13 that the ratio of maximum value of each curve versus the minimum value of each curve at 0 degrees increases as $\theta_{max}$ increases.

Figure 14:
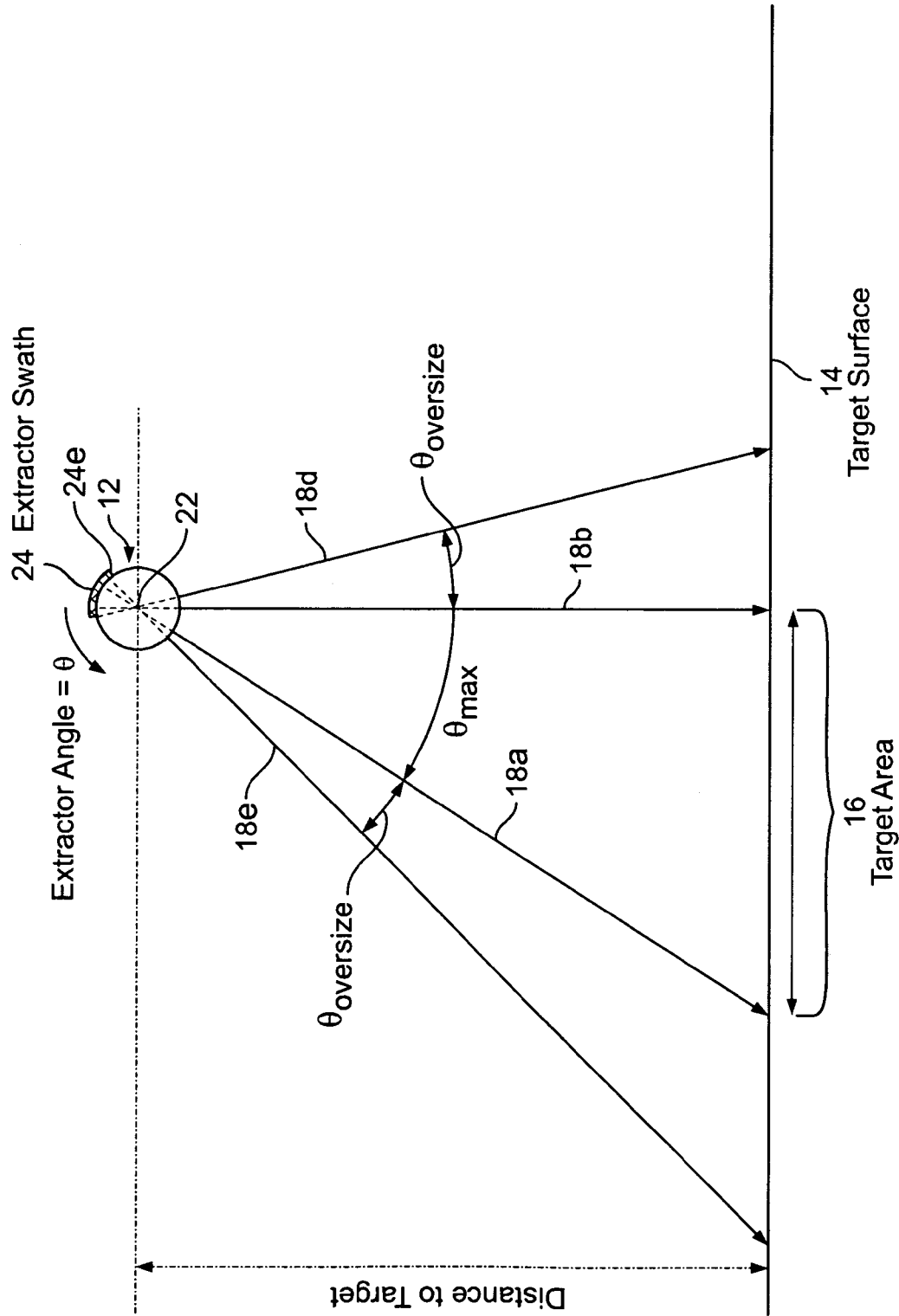
FIG. 14 is similar to FIGS. 2 and 10 but shows an asymmetric pattern of the light-rays from an asymmetric light-extraction means.

In FIG. 14, the placement, composition and the extent of the radial swath over the light pipe is selected in such a manner that the target light rays fall on target surface 14 only on one side of the light pipe—e.g., to the left of the light pipe as shown. The distance between the points of contact of light rays 18a and 18b with the target surface corresponds to the desired lateral dimension of target area. This results in an asymmetric distribution of the light rays falling on the target surface.

Like FIG. 10, light ray 18b of FIG. 14 covers the shortest distance from longitudinal center 22 of the light pipe to the target area, and light ray 18a covers the farthest distance from longitudinal center 22 to the target area. Overshoot light ray 18e, having an origin point 24e at the right-most point of the extension of the radial swath, falls beyond the width of the target area. The radial angle between light ray 18a and light ray 18e is $\theta_{oversize}$.

The light-extraction efficiency of radial swath 24 is determined by Equation 3 above, for $\theta_{max}-\theta_{oversize}<\theta<\theta_{oversize}$ wherein:
$\theta_{oversize}$~15
$\theta_{max}$=atan (TargetMax/Distance_to_Target)

In FIG. 14, positive θ angles are taken clockwise around the light pipe and negative θ angles are taken counter clockwise around the light pipe. The placement and the extension of the radial swath are chosen in a manner so that the target area width is half of the target area width in FIG. 10. The extension in the radial swath reaching point 24e corresponds to the overshoot light ray (e.g., 18e, FIG. 14), which falls on the target surface beyond the lateral dimension of the target area.

Figure 15:
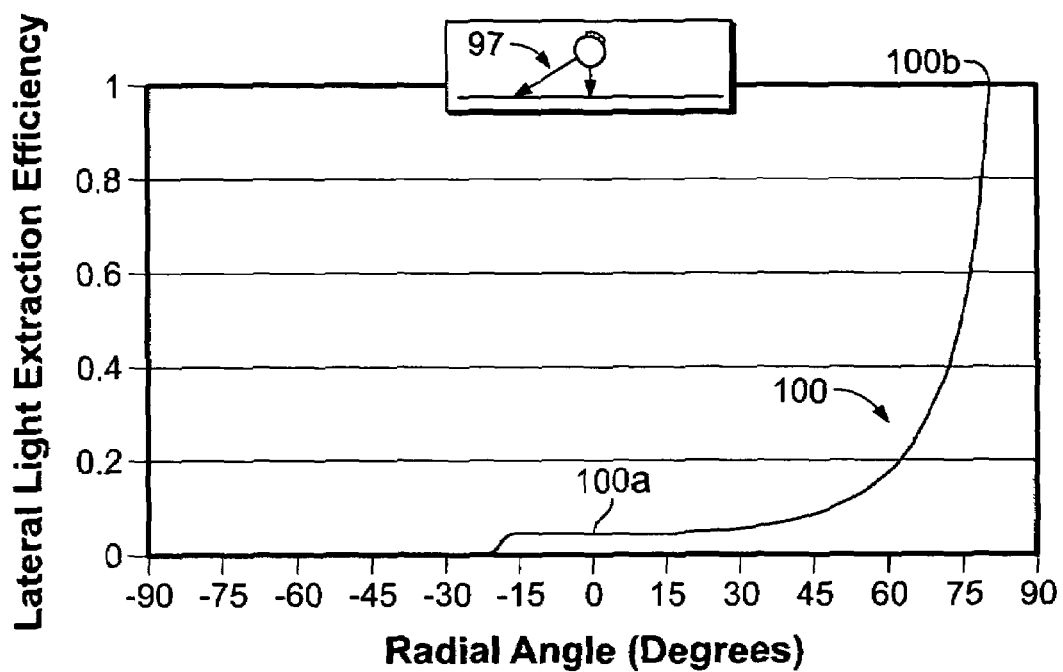
FIG. 15 is similar to FIG. 4 but concerns an asymmetric pattern of light-extraction means.

FIG. 15 shows a profile of efficiency of light-extraction means (e.g., 24, FIG. 14) versus a radial angle (e.g. θ in FIG. 2) between light rays 18d and 18e in FIG. 14. A legend 97, based on the asymmetrical arrangement of FIG. 14, shows that curve 100 relates to an asymmetrical arrangement. Unlike FIG. 11, the pattern of the light-extraction means is not laterally symmetric about 0 degrees, but rather asymmetric about 0 degrees. The angular coverage of the pattern of the light-extraction means results in curve 100 resembling the right half of the cross-section of a trough from 0 degrees.

Figure 16:
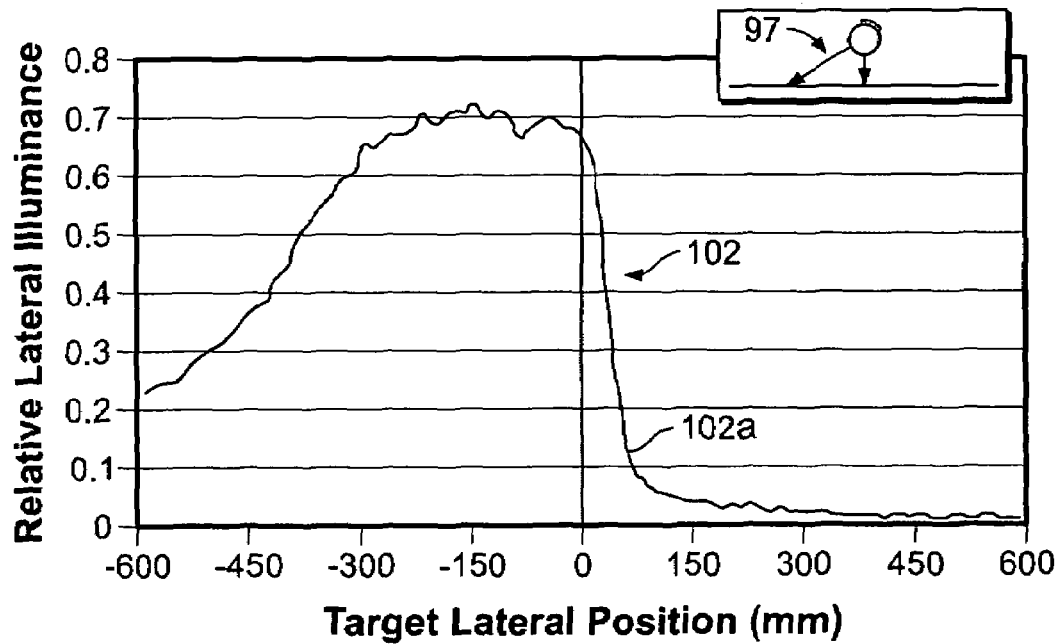
FIG. 16 is similar to FIG. 5 but concerns an asymmetric pattern light-extraction means.

FIG. 16 compares relative lateral illuminance from light-extraction means 24 (e.g., FIG. 14) against the position of a light ray on the target with respect to a light ray that strikes the target surface orthogonally. The relative illuminance varies due to the asymmetric light-extraction profile represented by curve 100 in FIG. 15. Relative lateral illuminance curve 102 results from efficiency curve 100 (FIG. 15), which drops from its peak at positions above +0 mm. The drop results from the placement of the radial swath on the light pipe. Overshoot light rays (e.g., 18d, FIG. 14) fall on the target area above position 0 mm, forming a tail 102a in curve 102.

For achieving a substantially uniform illuminance between −300 mm and 0 mm in FIG. 16, the following data applies to Equation 3 above:
Target Half Width=300 mm
Distance to Target=110 mm
Rod Diameter=19 mm
$\theta_{oversize}$=13 degrees
$(\theta_{max}+\theta_{oversize})$=82.9 degrees
N=3

Figure 17:
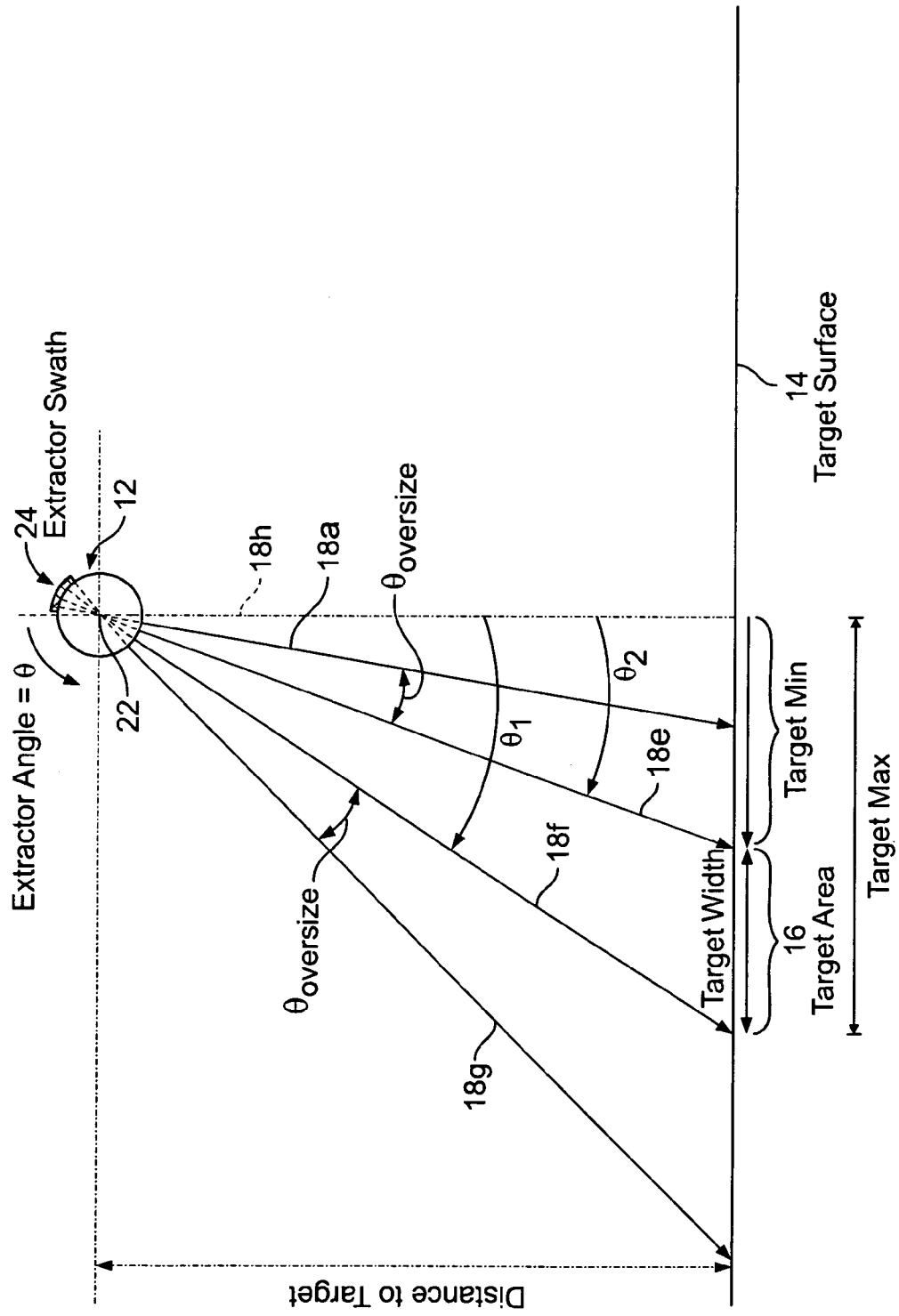
FIG. 17 is similar to FIGS. 2 and 10 but relates to an asymmetric pattern of light-extraction means.

In FIG. 17, TargetMax is the distance to one edge of the target area 16, whereas TargetMin is the distance to the other edge of the target area. Radial swath 24 is placed and extended in a way to produce light rays that fall on target surface 14 in such a manner that the subsumed target area 16 starts from a distance to the left of longitudinal center 22 of the light pipe. Imaginary line 18h covers the shortest distance to target surface 14 from longitudinal center 22, at a corresponding radial angle 0. Light ray 18e covers the closest distance from longitudinal center 22 to target area 16, and 18e is not orthogonal to target area 16, in contrast to corresponding light ray 18b in FIG. 10. An angle $\theta_2$ is formed between the imaginary line 18h and light ray 18e. Light ray 18f covers the farthest distance to the target area from the longitudinal center forming an angle $\theta_1$ with the imaginary line 18h. Target area 16 is formed between light rays 18e and 18f. A right-side overshoot region is formed between light rays 18a and 18e, with an angle $\theta_{oversize}$ formed between such rays. A left-side overshoot region is formed between light rays 18f and 18g, with another angle $\theta_{oversize}$ formed between such rays.

Figure 18:
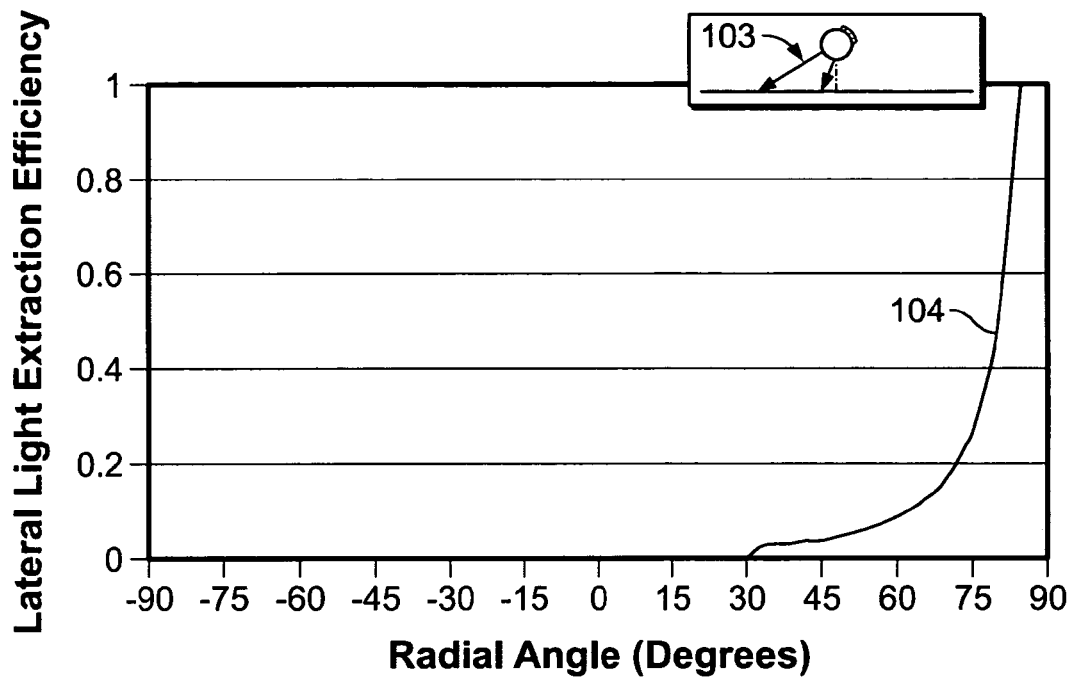
FIG. 18 is similar to FIG. 4 but relates to an asymmetric pattern of light rays on a target area.

The efficiency profile of the light-extraction means versus a radial angle θ (e.g., θ, FIG. 2) will result in smoothly varying efficiency profiles (e.g. FIG. 4). Equation 3 provides a desired control of lateral illuminance for $\theta_1-\theta_{oversize}<\theta<\theta_2+\theta_{oversize}$ wherein:

$\theta_{oversize}\sim 15$ $\theta_{max}=\text{MAX}(|\theta_1|,|\theta_2|)$ $\theta_1=\text{atan}(\text{TargetMax}/\text{Distance\_to\_Target})$ $\theta_2=\text{atan}(\text{TargetMin}/\text{Distance\_to\_Target})$ FIG. 18 shows a curve 104 of efficiency of light-extraction means similar to FIG. 15 in resembling a partial trough, but covers radial angles from about 29.3 degrees to about 87.6 degrees. A legend 103, based on the asymmetrical arrangement of FIG. 17, shows that curve 104 relates to an asymmetrical arrangement.

Figure 19:
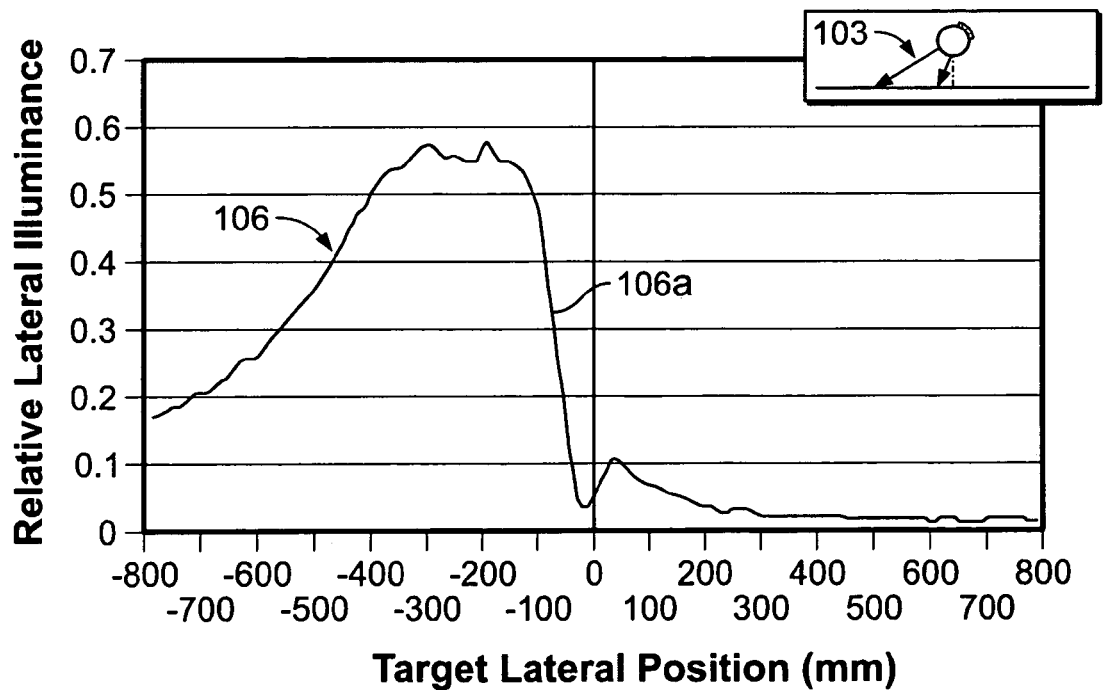
FIG. 19 is similar to FIG. 5 but relates to an asymmetric pattern of light-extraction means on a target area.

FIG. 19 shows a curve 106 of relative lateral illuminance against lateral position on a target area, resulting from the efficiency profile of FIG. 18. Curve 106 of FIG. 19 is similar to curve 102 of FIG. 16, but its peak is shifted to the left compared with curve 102 of FIG. 16. A tail 106a in curve 106 (FIG. 19) begins at a position below 0 mm.

FIGS. 18 and 19 are similar to FIGS. 15 and 16, respectively, but the efficiency profile curves show an angular shift for the coverage of radial swath and the target area respectively for the relative efficiency and the relative lateral illuminance.

For achieving substantially uniform illuminance between −400 mm and −100 mm in FIG. 19, the following data applies to Equation 3 above:

Target Max, Min=−400 mm to −100 mm

Distance to Target=110 mm

Rod Diameter=19 mm $\theta_{oversize}=13$ degrees $(\theta_{max}+\theta_{oversize})=87.6$ degrees

N=3

Figure 20:
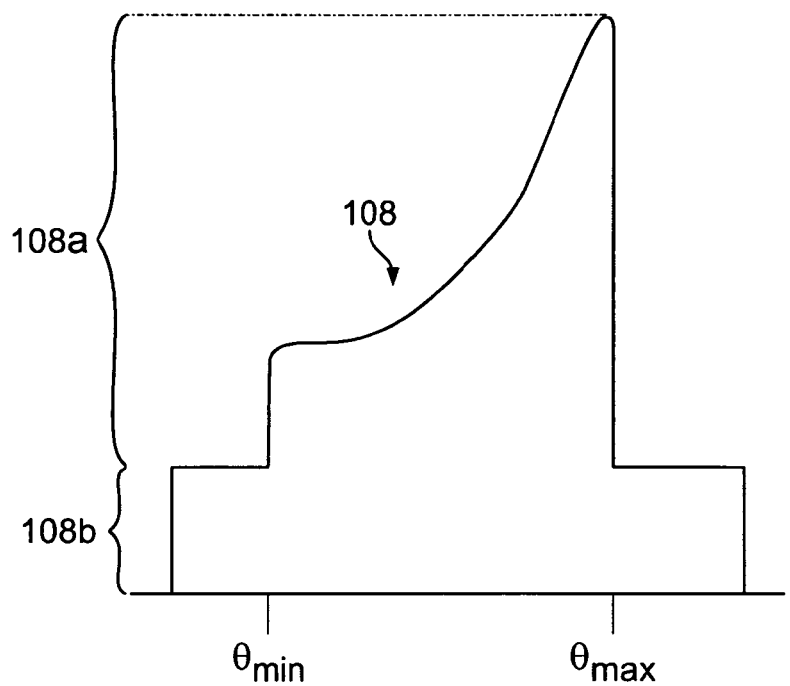
FIG. 20 is similar to FIG. 14 but shows an exemplary, additional, constant component of efficiency of light-extraction means.

FIG. 20 shows an efficiency of light-extraction curve 108 with a curved section 108a and an underlying constant section 108b. Curved section 108a generally corresponds to curve 100 in FIG. 15, and relates to the first term including "K" in Equation 3 above. Curve section 108b is shown as a constant height, resembling a pedestal, below curve section 108a, and relates to the second term including f (θ) in Equation 3 above. The term f (θ), however, can have many different forms as explained above in connection with Equation 3, and so may not necessarily resemble curve section 108a.

FIGS. 21, 23, 24A-24B and 25 show arrangements of luminaires useful for freezer cases in grocery stores, for instance.

Figure 21:
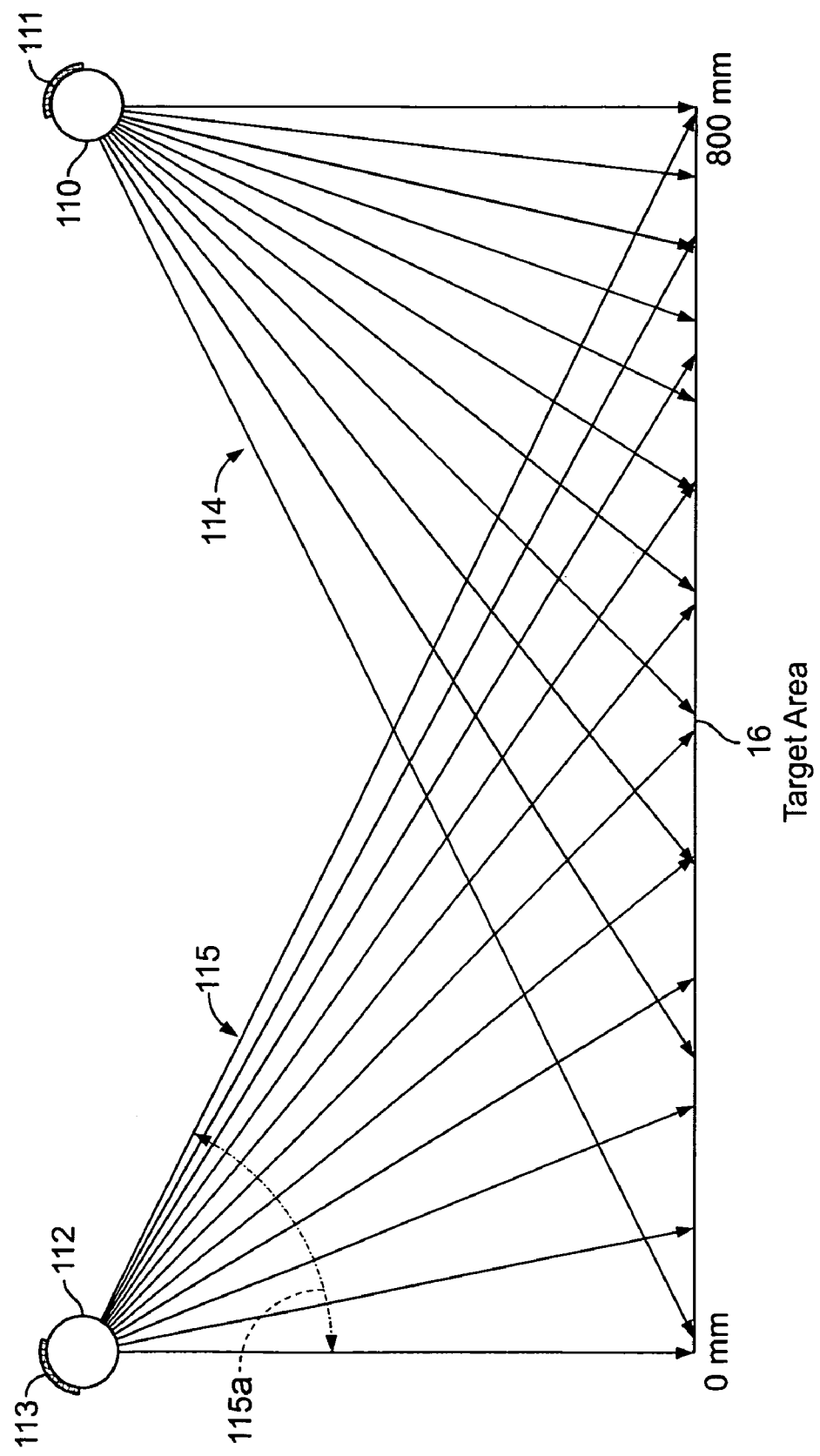
FIG. 21 is a cross-sectional view of a pair of luminaires illuminating a common target area.

FIG. 21 shows a pair of symmetrical light pipes 110 and 112 with respective light-extraction means 111 and 113. Both light pipes illuminate the same target area 16, in a manner explained below in connection with FIG. 22. Preferably, a "coverage" angle 115a, between the shortest path of light propagation to the target area and the longest path of light propagation to the target area, exceeds 30 degrees, and more preferably is between 40 and 100 degrees. Such higher values of coverage angle, or $\theta_{max}$, pose the greatest challenges to creating an efficiency profile, as in FIG. 15, requiring higher and higher light-extraction efficiencies at the right-hand edge of that profile. Higher values of a coverage angle 115a may also occur where the minimum distance from the longitudinal center of each light pipe 110 or 112 to target area 16 is between about 10 cm and 30.5 cm, or more preferably between 10 cm and 14 cm. The foregoing ranges of distance may be typical in freezer cases for grocery stores, for example.

Figure 22:
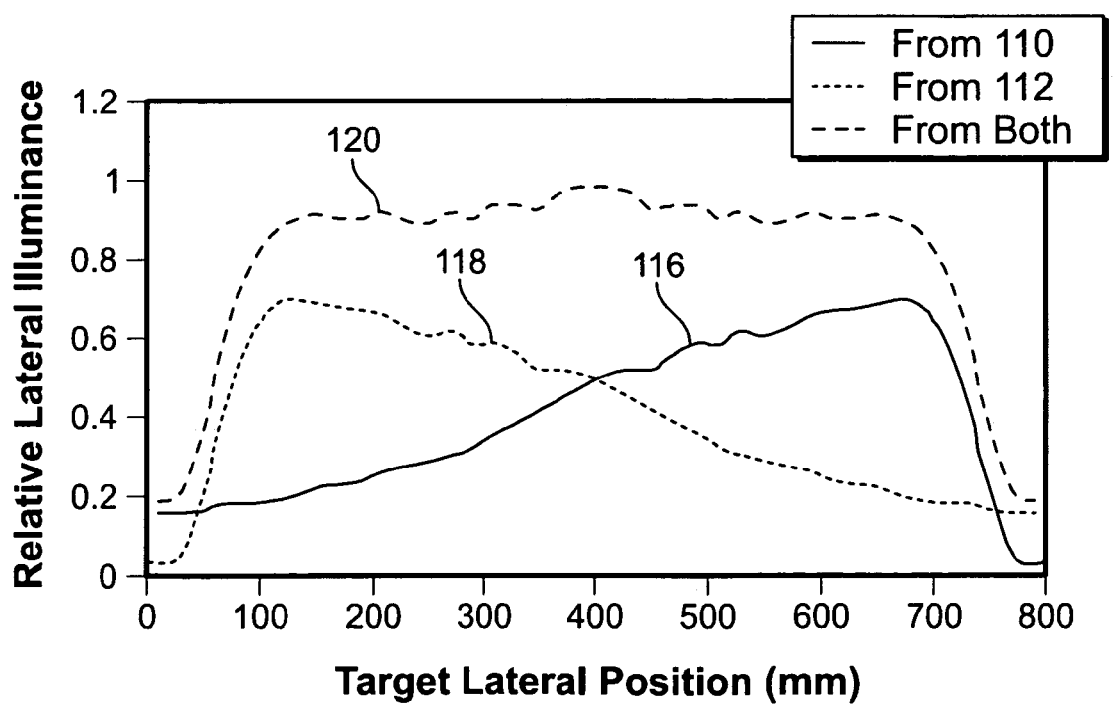
FIG. 22 is similar to FIG. 5 but shows curves with different shapes for a system with two luminaires illuminating a common target area.

In FIG. 22, curve 116 shows the contribution to illuminance from light rays 114 (FIG. 21) from light pipe 110. Curve 118 shows the contribution to illuminance from light rays 115 (FIG. 21) from light pipe 112. Curve 118 is laterally symmetrical to curve 116 about a lateral target of light pipes 110 and 112 is non-uniform, but the cumulative illumination (curve 120) is substantially uniform.

In producing curve 116 of FIG. 22, which is symmetrical to curve 118, the following data applies to Equation 3 above:

Target Max, Min=400 mm to 700 mm

Distance to Target=110 mm

Rod Diameter=19 mm $\theta_{oversize}=13$ degrees $(\theta_{max}+\theta_{oversize})=87.6$ degrees

N=2.5.

Figure 23:
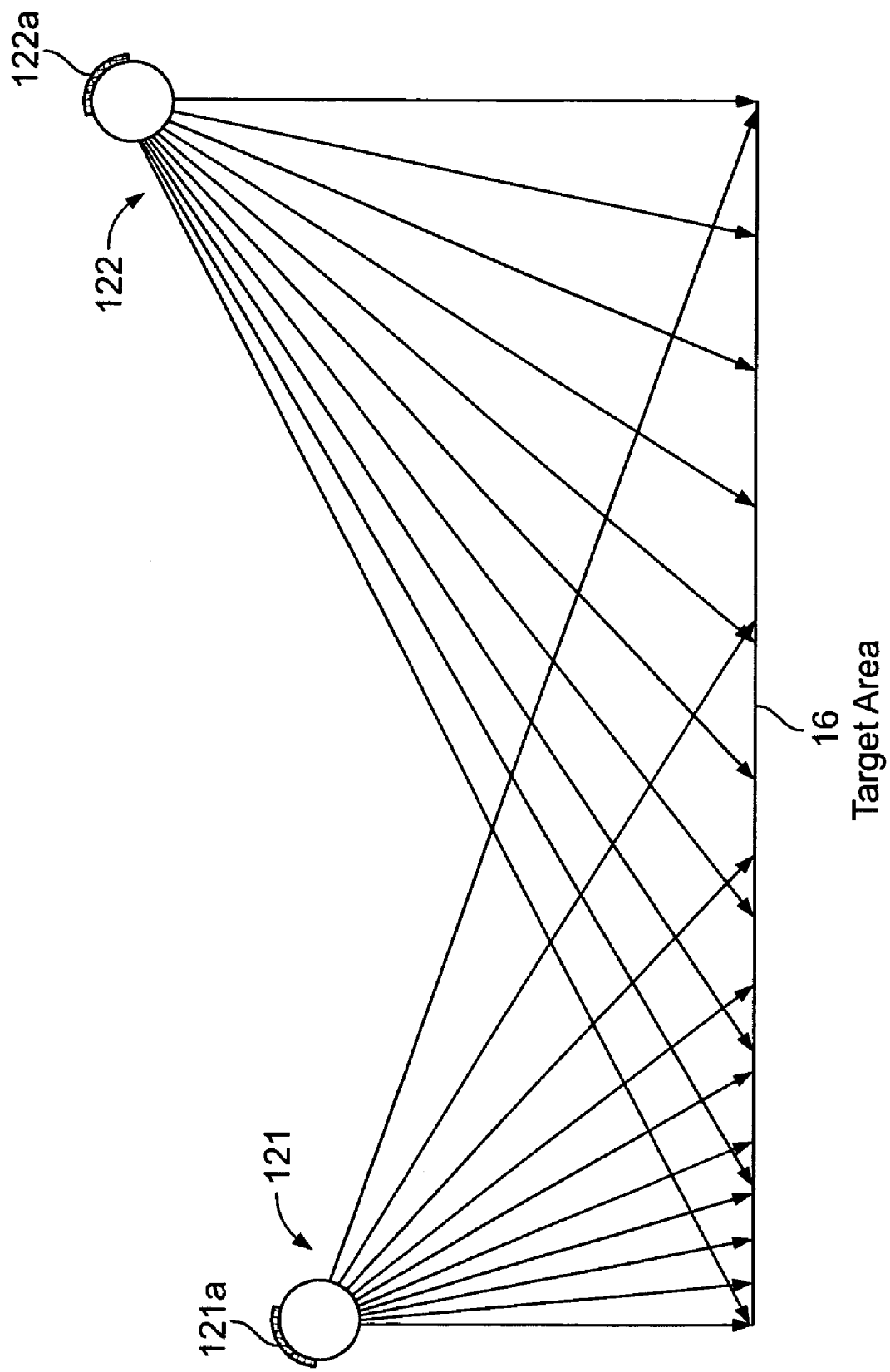
FIG. 23 is similar to FIG. 21 but shows different vertical placements of light pipes with respect to a target area.

In FIG. 21, if light pipe 112 were spaced more closely to the target surface than light pipe 110, an arrangement similar to of FIG. 23 would result.

In FIG. 23, light pipe 121 is closer to target surface 16 than light pipe 122. Light-extraction means 121a and 122a may be adjusted as necessary to cumulatively produce substantially uniform lateral illuminance across the target area.

FIG. 24A shows three light pipes 124, 126 and 128. The outside light pipes 124 and 128 have respective single light-extraction swath patterns 124a and 128a. However, central light pipe 126 has two separate light-extraction swath patterns 126a and 126b, which are more easily observed in FIG. 24B. Pattern 126a illuminates target area 16b, which is also illuminated by pattern 128a. Similarly, pattern 126b illuminates target area 16a, which is also illuminated by pattern 124a. Substantially uniform lateral illuminance can be obtained over target areas 16a and 16b in the same manner as described above in connection with FIGS. 22-23.

Figure 25:
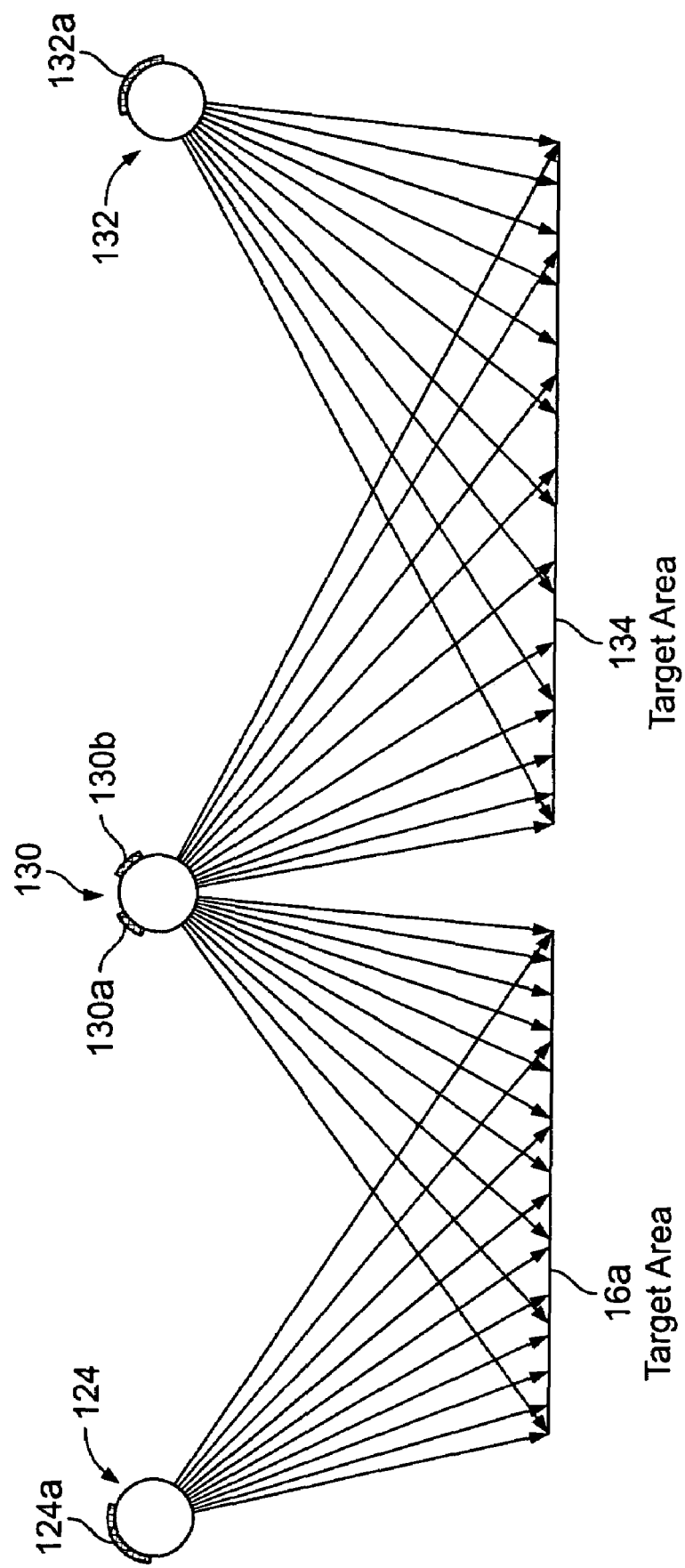
FIG. 25 is generally similar to FIG. 24A but with the target areas and light pipe spacing changed.

In FIG. 24A, target area 16a has the same lateral dimension as target area 16b. FIG. 25 shows a similar arrangement as in FIG. 24A, but with a target area 134 having a larger lateral dimension than target area 16a.

In FIG. 25, light pipe 130 has a light-extraction pattern 130b that may be the same as light-extraction pattern 126b (FIG. 24A), but has a light-extraction pattern 130a that differs from light-extraction pattern 126a (FIG. 24A) so as to illuminate a larger target area 134 than target area 16b (FIG. 24A). Similarly, light-extraction pattern 132a on light pipe 132 is chosen to illuminate larger target area 134.

Figure 26:
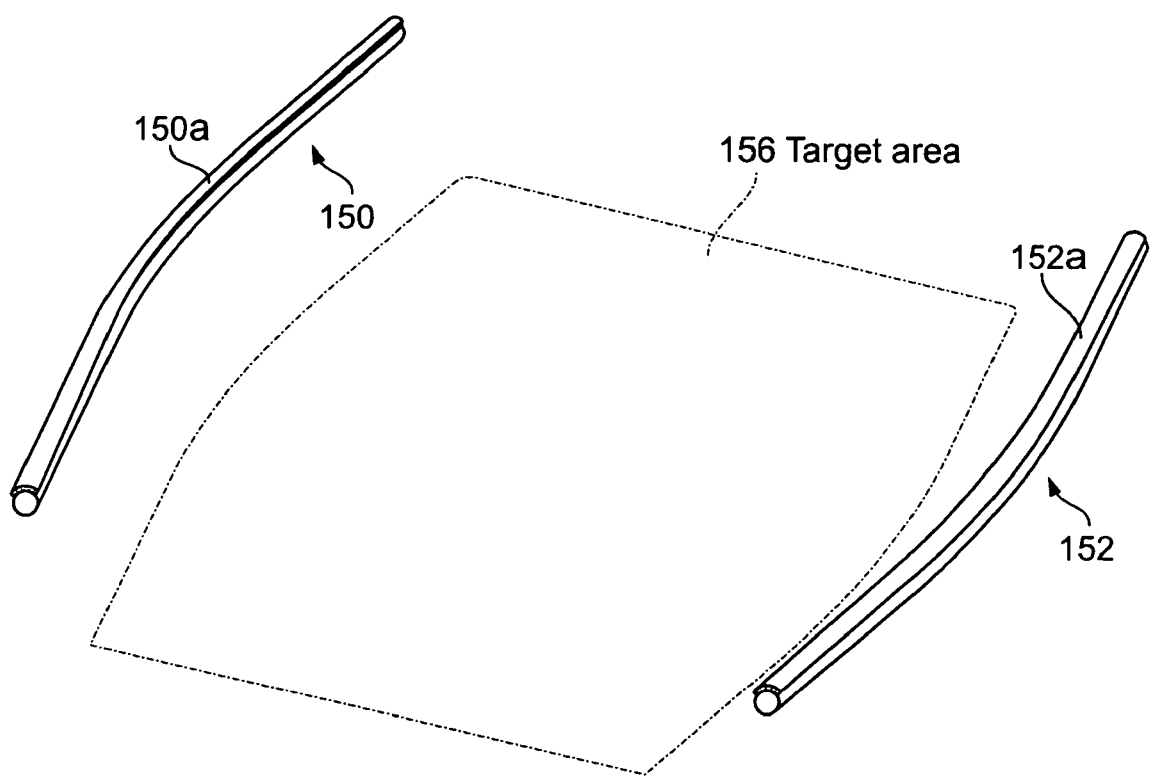
FIG. 26 is an upper perspective view of a pair of non-linear light pipes above a non-rectangular target area.

FIG. 26 shows light pipes 150 and 152, each with respective light-extraction means 150a and 152a. Light pipes 150 and 152 are non-linear so as to facilitate cooperative illumination of a preferably non-rectangular target area 156. Light pipes 150 and 152 may be spaced the same distance from the target area.

Figure 27:
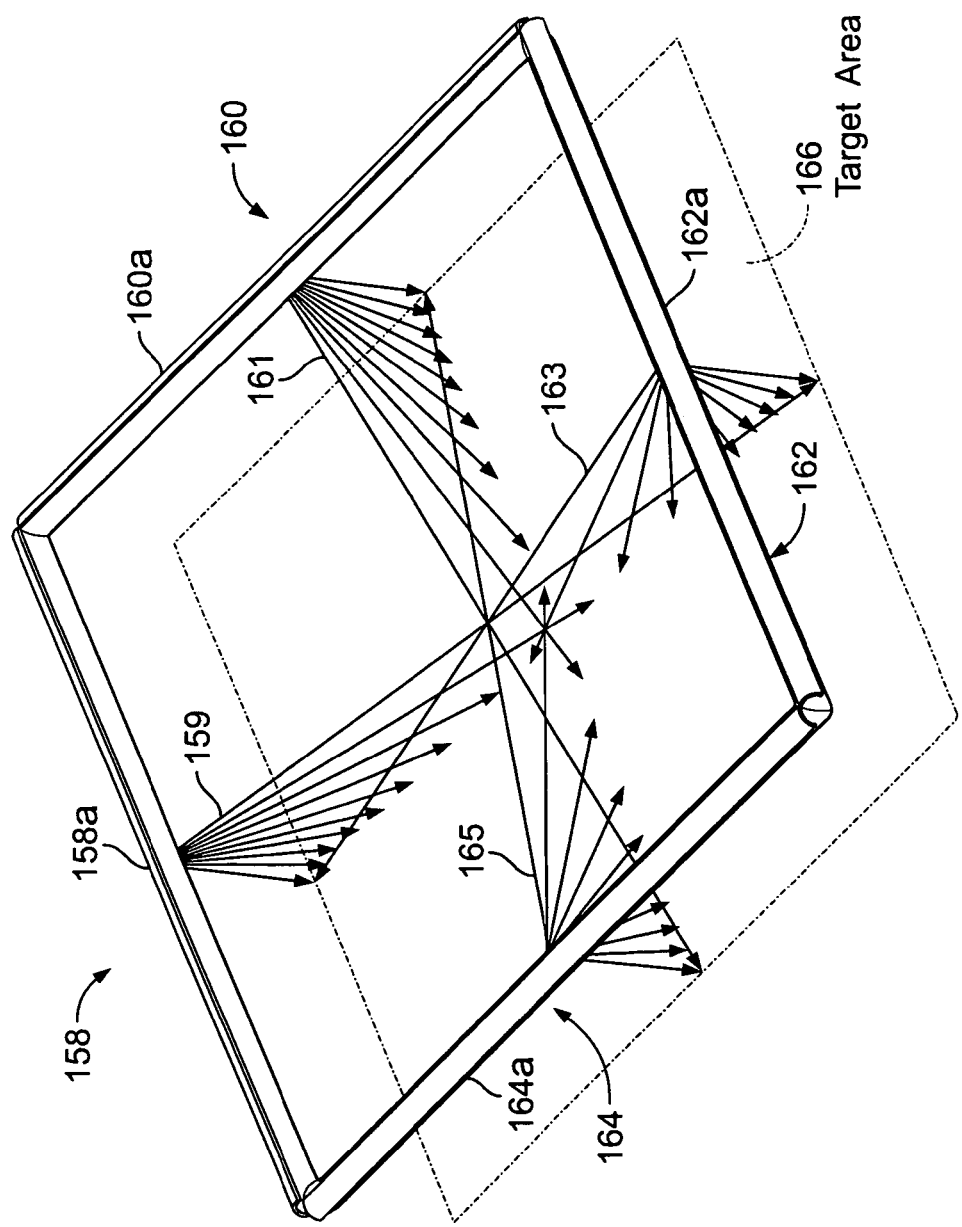
FIG. 27 is an upper perspective view of four light pipes positioned to form a closed shape above a target area.

FIG. 27 shows four light pipes 158, 160, 162 and 164, each with respective light-extraction means 158a, 160a, 162a and 164a. These four light pipes collectively illuminate a target surface. Representative light rays 159, 161, 163 and 165 are shown reaching target area 166. Means for introducing light to light pipes 158, 160, 162 and 164 are omitted from FIG. 27. Although four light pipes are shown in FIG. 27, three, five or more light pipes, some of which may be non-linear as shown in FIG. 26, may be used if desired.

2. Practical Implementations of Patterns for Light-extraction Means

Various practical implementations of patterns for light-extraction means are now considered.

FIGS. 28A-28E shows light pipes 12a-12e with various patterns of light-extraction means, each pattern having continuous variations in light-extraction efficiency in the longitudinal direction of the light pipes. A main consideration of the present invention, however, concerns variations in extraction efficiency in the lateral direction.

Figure 28A:
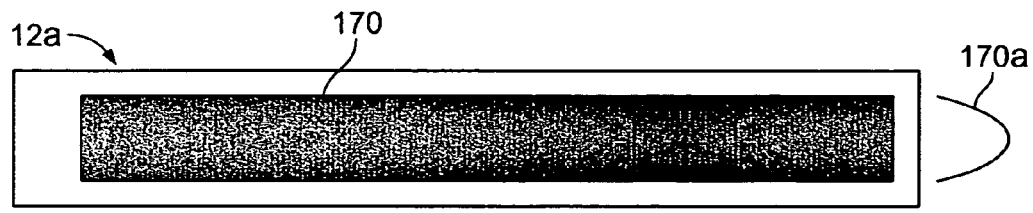
FIGS. 28A to 28D are top views of light pipes with various patterns of light-extraction means according to the invention.
Figure 28B:
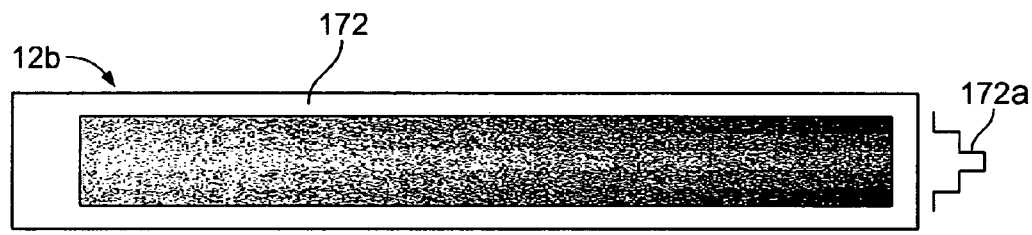
Figure 28C:
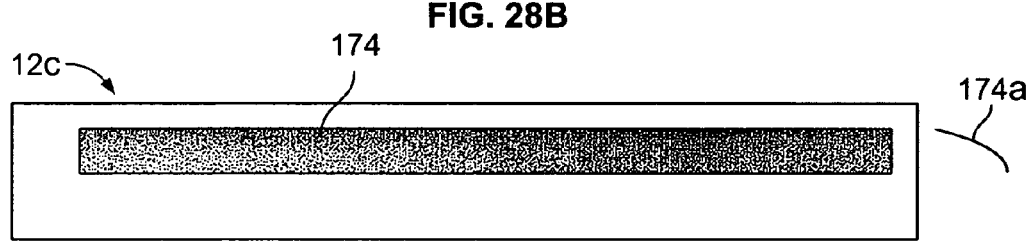
Figure 28D:
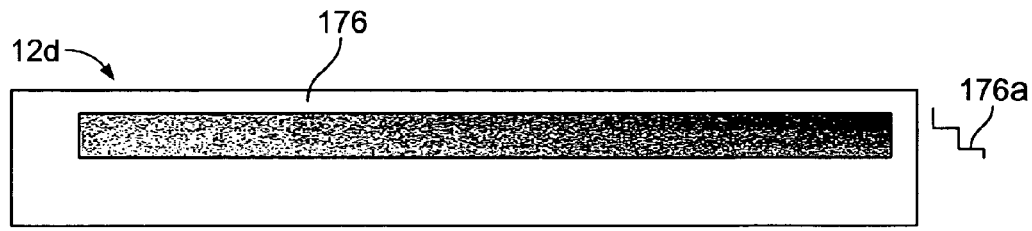
Figure 28E:
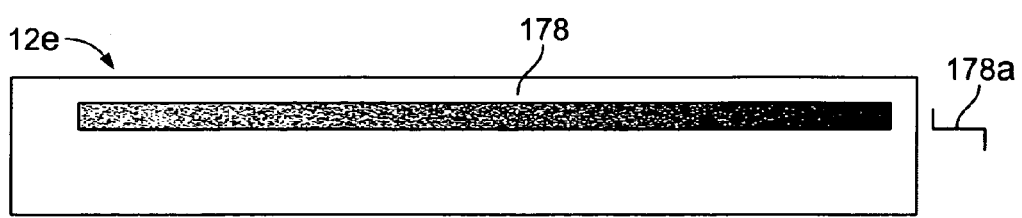
FIG. 28E is a top view of a light pipe with a single-stripe pattern of light-extraction means.

FIGS. 28A and 28B show laterally symmetric light-extraction patterns, and FIGS. 28C-28E show laterally asymmetric light-extraction patterns. By way of comparison, a symmetric pattern is shown in FIG. 10, and asymmetric patterns are shown in FIGS. 14 and 17.

FIG. 28A shows a light pipe 12a with a pattern 170 of light-extraction means having a smoothly curving profile of efficiency of light extraction, such as shown in FIG. 11. For convenience, a similar smoothly curving profile 170a is shown in FIG. 28A, but is rotated 90 degrees counterclockwise compared to profile 40 of FIG. 4, for instance, so as to directly associate with light-extraction pattern 170. Profile 170a is taken at the right end of pattern 170.

FIG. 28B shows a light pipe 12b with a light-extraction pattern 172 whose behavior approximates that of smoothly curving pattern 170 of FIG. 28A. However, rather than having a smoothly curving profile, pattern 172 is formed of stripes of constant lateral efficiency, which collectively have a stepped profile 172a of light-extraction efficiency. Stepped profile 172a, similar to profile 170a of FIG. 28A, is taken at the right end of light-extraction pattern 172.

FIG. 28C and FIG. 28D show light pipes 12c and 12d, respectively, having asymmetric patterns 174 and 176 of light-extraction means, respectively. FIG. 28C shows pattern 174 with a smoothly-curving extraction-efficiency profile 174a. FIG. 28D shows pattern 176 with a stepped extraction-efficiency profile 176a. Efficiency profiles 174a and 176a are similar to profile 170a of FIG. 28A, and are taken at the right end of the light-extraction means 174 and 176, respectively.

Regarding FIGS. 28A-28D, the spatial averaging effects of light traveling to the far field of the light pipe to reach a target area, causes the stepped light-extraction efficiency profiles 172a (FIG. 28B) and 176a (FIG. 28D) to attain a substantively similar lateral illuminance on a target area as smoothly-curving profiles 170a (FIG. 28A) and 174a (FIG. 28C), respectively.

FIG. 28E shows a light pipe 12e with a single-stripe light-extraction pattern 178, having constant lateral extraction efficiency but having a gradient in light-extraction efficiency along the length of the light pipe. The extraction-efficiency profile in the lateral direction is shown at 178a, which is similar to profile 170a of FIG. 28A. The efficiency profile is taken at the right end of the light-extraction means 178.

Figure 29A:
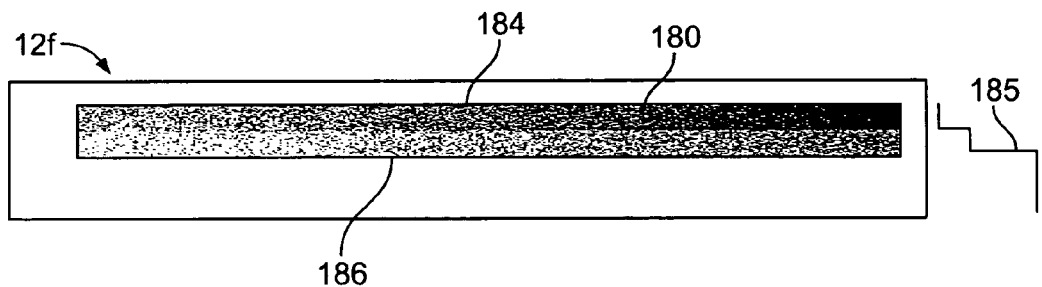
FIGS. 29A-29C are top views of light pipes with further patterns of light-extraction means according to the invention.
Figure 29B:
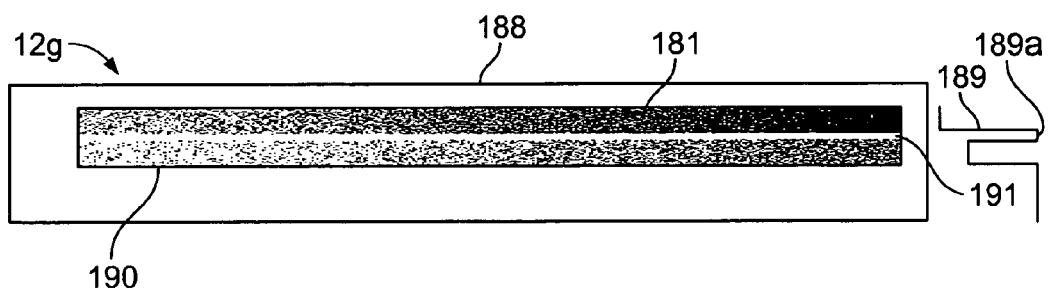
Figure 29C:
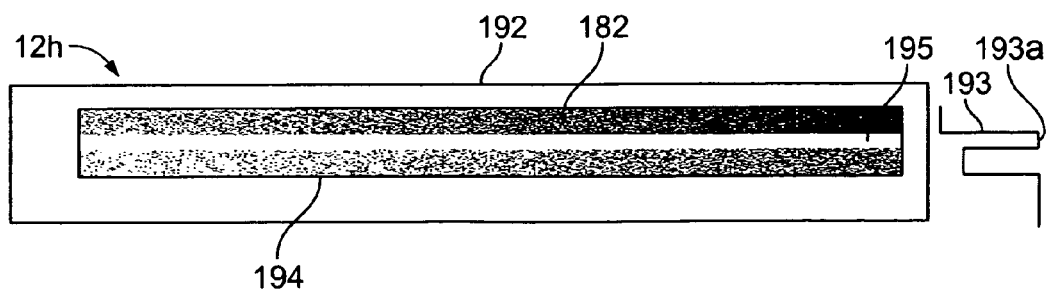

FIGS. 29A-29C show light-extraction means with the absence or presence of lateral gaps between adjacent longitudinal stripes of such light-extraction means.

FIG. 29A shows a light pipe 12f with light-extraction means 180 having two stripes 184 and 186 with different lateral extraction efficiencies between the two stripes. There is no lateral gap between the stripes, so that the stripes adjoin each other. Thus, corresponding extraction efficiency profile 185, similar to profile 170a of FIG. 28A, has a monotonically increasing step pattern of the two stripes.

In contrast, FIG. 29B shows a light pipe 12g with light-extraction means 181 having two stripes 188 and 190, similar to stripes 184 and 186 (FIG. 29A) but which are laterally spaced from each other by a gap 191. The gap between the two stripes gives rise to a stepped, extraction-efficiency profile 189, similar to profile 170a of FIG. 28A, having a zero value at 189a. Typically, gapped light-extraction means 181 (FIG. 29B) will produce lateral illuminance similar to non-gapped light-extraction means 180 (FIG. 29A) when the target area for each light pipe is in the far field of the light pipe and the gap is small. This similarity is due to spatial averaging effects that are especially strong when the gap width is less than about 25 degrees and the light pipe is round.

FIG. 29C shows further shows a light pipe 12h with light-extraction means 182 having two stripes 192 and 194 with a larger gap 195 between them compared to gap 191 in FIG. 29B. Larger gap 195 results in extraction-efficiency profile 193, similar to profile 170a of FIG. 28A, having zero value for a larger distance than in the steps of the profile at 193a. Typically, light-extraction means 182 will produce substantially the same lateral illuminance as light-extraction means 180 (FIG. 29A) and 181 (FIG. 29B), when the target areas are in the far field of the light pipes. This, again, is due to spatial averaging effects.

FIG. 30A shows a light pipe 121 with light-extraction means 196 having five separate longitudinal stripes, comprising a pair of stripes 198, a pair of stripes 200 and a single stripe 202. As shown in FIG. 30B, the foregoing stripes have light-extraction efficiency profiles 198a, 200a and 202a along the length of light pipe 121 that increase from left to right. The foregoing stripes also have a light-extraction profile 204, similar to profile 170a of FIG. 28A, in the lateral direction (FIG. 30A), which is stepped and symmetrical about its lateral center. The present invention is mainly concerned with the lateral extraction-efficiency profile shown, for instance, at 204. Note that for this luminaire, the light from the light source (or light pipe) would enter from the left of the figure.

The black-colored portions of light-extraction means 196 preferably all have the same construction per unit area. For instance, light-extraction means 196 may comprise a uniform-thickness layer of paint having the black pattern illustrated in FIG. 30A. On the other hand, the average light-extraction efficiency from multiple points of the light-extraction means, where a target area is in the far field of the light pipe, effectively varies as shown by FIG. 30B and profile 204. This is due to spatial averaging effects.

Figure 31A:
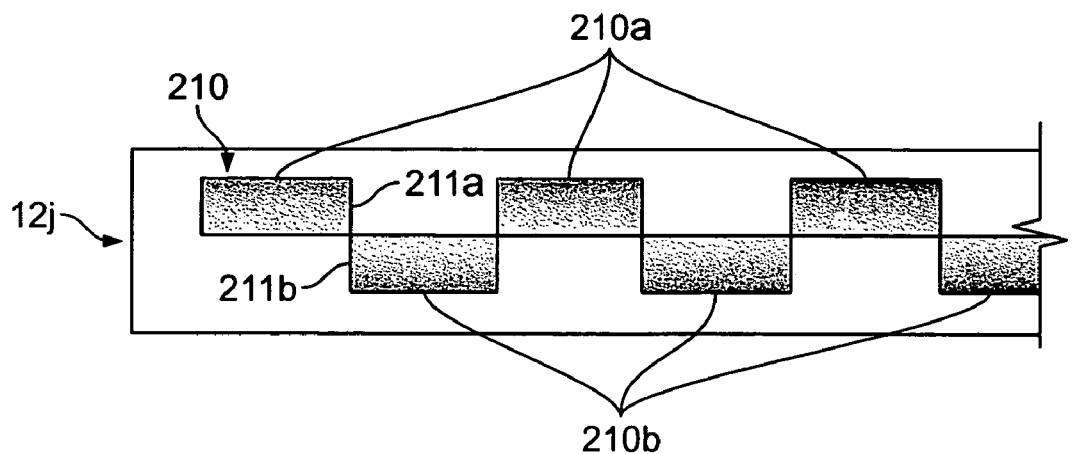
FIGS. 31A-31C show top views of light pipes with alternating patterns of light-extraction means according to the invention.
Figure 31B:
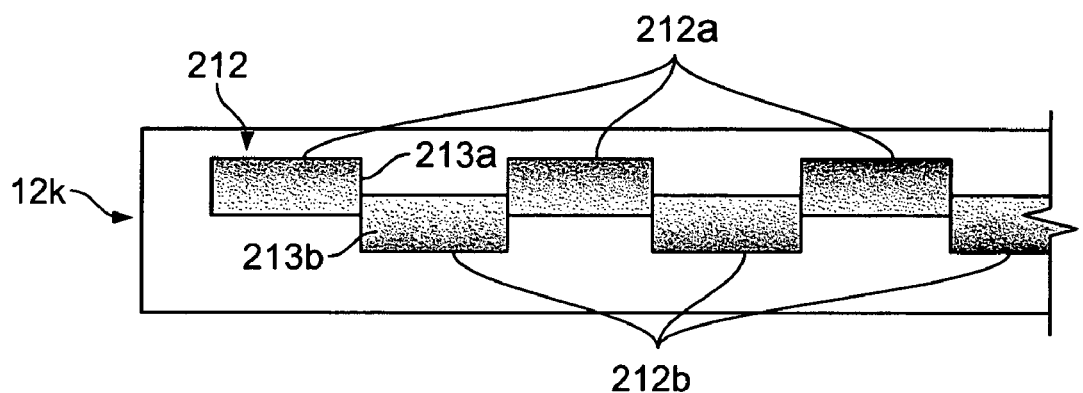
Figure 31C:
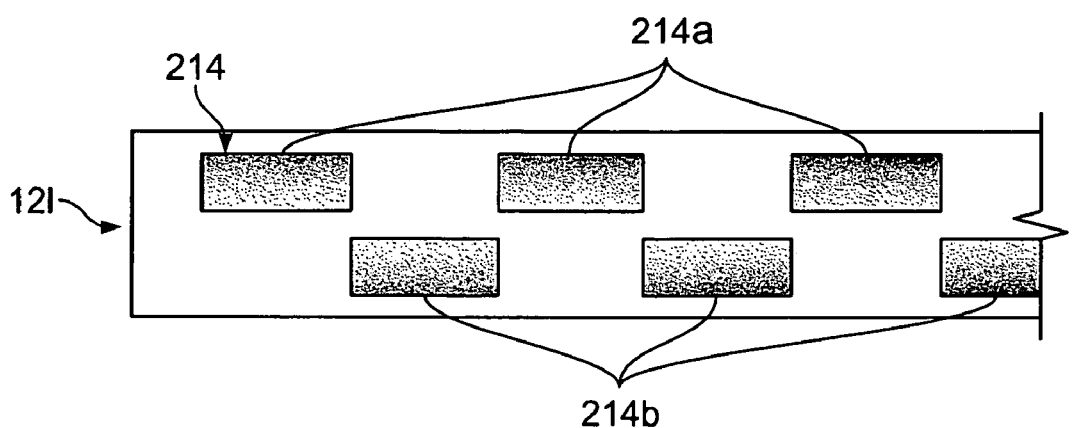

FIGS. 31A-31C show light pipes 12j-12l with alternating light-extraction patterns, which may be similar to light-extraction pattern 174 of FIG. 28C that has a smoothly-varying curve pattern in the lateral direction.

FIG. 31A shows light pipe 12j with light-extraction means 210. Light-extraction means 210 has portions 210a and 210b along the length of the light pipe. Portions 210a and 210b are arranged along the length of the light pipe, alternately, first on a first radial side of the light pipe (e.g., leftmost portion 211a), and then on a second radial side of the light pipe (e.g., leftmost portion 211b). One particular benefit of this type of pattern is a reduction in losses due to absorption in the extractors, particularly when large swath widths are required.

FIG. 31B similarly shows a light pipe 12k with light-extraction means 212, having portions 212a and 212b arranged in alternating fashion similar to portions 210a and 210b of FIG. 31A. However, there is now an overlap between the radial swaths covered by each pattern FIG. 31C similarly shows a light pipe 121 with light-extraction means 214 having portions 214a and 214b arranged in alternating fashion similar to portions 210a and 210b of FIG. 31A. However, portions 214a and 214b are laterally spaced from each other, whereas portions 210a and 210b (FIG. 31A) adjoin each other at adjacent corners.

In both FIGS. 31A and 31C, the proximally adjacent portions of the light-extraction means, along the length of the light pipe (e.g., portions 211a and 211b in FIG. 31A) do not radially overlap each other. In contrast, in FIG. 31B, the proximally adjacent portions of the light-extraction means, along the length of the light pipe (e.g., portions 213a and 213b in FIG. 31B) radially overlap each other.

3. Other Considerations

Figure 32:
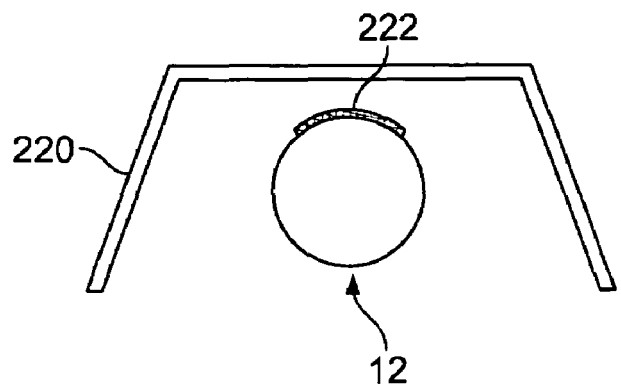
FIG. 32 shows a cross-sectional view of a light pipe with a reflector.

FIG. 32 shows a light pipe 12 having a radial swath 222 of light-extraction means, and a reflector 220. Such a reflector might be used in some embodiments of the invention to enhance the directionality of the light extracted from the light pipe. Reflector 220 preferably has a non-specular, diffuse reflecting surface and the reflector is shifted away from the light pipe. Such a surface and geometry increases the chances that light will reflect from the reflector but not pass back through the light-extraction means or through the remainder of the luminaire. Specular reflectors with shapes designed to minimize the flux restriking the light pipe can also be used efficiently. Additionally, light pipe 12 could be inverted so that the light-extraction means is on the underside of the light pipe. In such an arrangement, the reflector can be shaped to impart directionality to the resulting light beam. Additionally, the output face of the reflector can include a diffuser so that the light pipe plus reflector plus diffuser form a light box for backlighting applications such as displays and signs.

Figure 33:
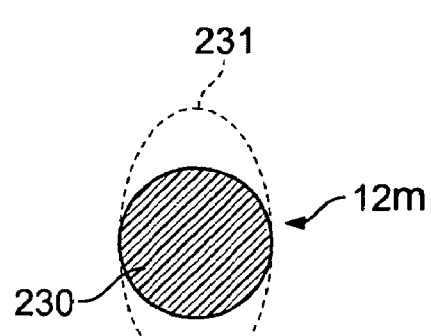
FIGS. 33 and 34 are cross sectional views of light pipes that may be used in luminaires according to the invention.
Figure 34:
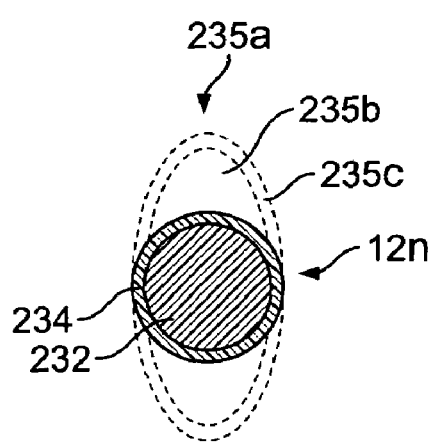

FIGS. 33 and 34 show cross sectional views of luminaires. FIG. 33 shows a light pipe 12m having a core 230. FIG. 34 shows a contrasting light pipe 12m having a core 232 and also a transport cladding 234. Light pipe 12m of FIG. 33 relies on a "cladding" consisting of air. Typically, transport cladding 234 of FIG. 34 will have an index of refraction substantially larger than that of air but substantially less than that of the core. Light pipe 12m of FIG. 33 is free of such a transport cladding. The use of a non-absorbing transport cladding as in FIG. 34 can typically result in about one percent efficiency increase over the use of an air cladding as in FIG. 33.

As shown in FIGS. 33 and 34, the shape of each light pipe 12m and 12n is typically round; the shape of the light pipe can also consist of an ellipsis, shown as 231 and 235a in FIGS. 33 and 34 respectively. FIG. 33 shows an exemplary elliptical light pipe 231. The light pipe 231 relies on a "cladding" consisting of air, similar to the light pipe 12m of FIG. 33. FIG. 34 shows an exemplary light pipe 235a having a core 235b and a cladding 235c.

A preferred radial swath (e.g., 24, FIG. 2) of light-extraction means comprises a layer of paint exhibiting Lambertian-extraction and having a binder with a refractive index about the same as, or greater than that of, the core. Suitable light-extraction particles are added to the paint, such as titanium dioxide or many other materials as will be apparent to those of ordinary skill in the art. Preferably, the paint is an organic solvent-based paint.

Three paints that have performed well are as follows: (1) An oil-based paint with an alkyd binder, sold by Flamuco GmbH, Munich, Germany, under the brand name CUSTO-DIN, with Art. No. 52029 performed well. The foregoing company has apparently been acquired by Brillux GmbH & Co. KG of Munster, Germany. The paint solids contain approximately 41 percent by weight titanium dioxide particles, which serve as light-extraction particles, and approximately 59 percent by weight alkyd binder. (2) A second oil-based paint sold by Nazdar of Shawnee, Kans., as "9775 Super Opaque White" from the 9700 series of "All Purpose Screen Ink", also performed well. (3) A third oil-based paint supplied by Sherwin Williams of Cleveland, Ohio, as aerosol paint with $T_iO_2$ pigment, also performed well.

Light-extraction means of the foregoing type of paint can be applied to a luminaire by first applying a stencil (not shown) to the luminaire. The stencil has cut-out portions corresponding to the desired pattern of light-extraction means (e.g., 196, FIG. 30A). Then, paint is applied to the exposed areas of the luminaire, and the stencil removed.

An alternative way to apply light-extraction means to a luminaire is to apply vinyl sticker material in the desired shape of light-extraction means to the luminaire. Appropriate vinyl stickers have been supplied by Avery Graphics, a division of Avery Dennison of Pasadena, Calif. The film is an adhesive white vinyl film of 0.146 mm, typically used for backlit signs.

Further light-extraction means are described in connection with FIGS. 35-37.

Figure 35:
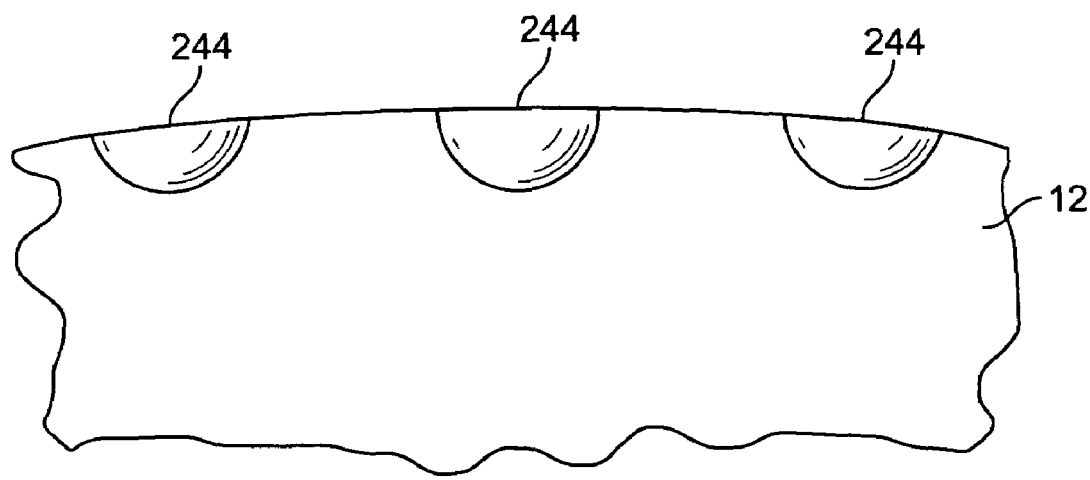
FIG. 35 is a cross-sectional view of a small section of the surface of a light pipe, greatly magnified, showing a textured pattern of light-extraction means.
Figure 36A:
FIGS. 36A-36D show alternative shapes that can replace the hemispherical shapes of FIG. 35.
Figure 36B:
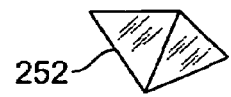
Figure 36C:
Figure 36D:

FIG. 35 shows three hemispherical depressions 244 in the surface of a light pipe 12. Many such hemispherical depressions can create a light-extraction means on the luminaire. Other shapes for depressions, as shown in FIGS. 36A-36D, respectively comprise a prism, a pyramid, a cone or a half cylinder. Shapes that can be used to extract light are not limited to those shown here.

Alternatively, the hemispherical shapes 244 in FIG. 35 and the other shapes of FIGS. 36A-36D can be inverted vertically and form bumps on the surface of light pipe 12 of FIG. 35.

Figure 37:
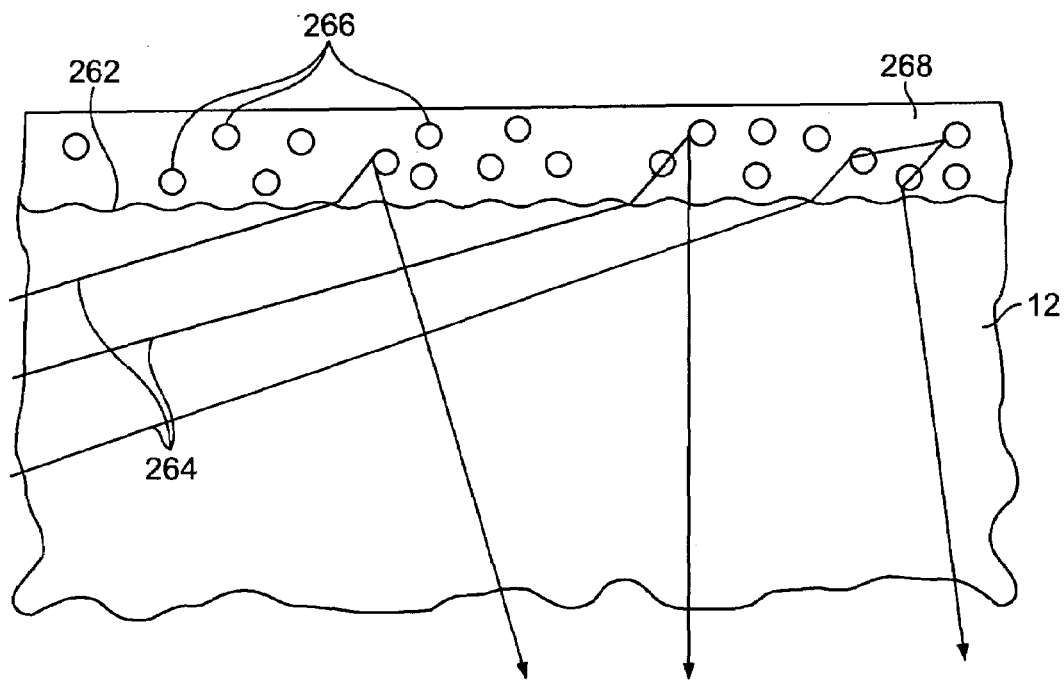
FIG. 37 is a sectional view of a light pipe with two types of light-extraction means.

FIG. 37 shows a light pipe 12 having two types of light-extraction means. First, a roughened surface 262, which may be formed by chemical etching, helps to extract light from the luminaire. This is shown by light rays 264 which intercept roughened surface 262, and are directed upwardly. Second, light-extraction particles 266 in a layer of paint 268 then serve to direct light downwardly If desired, roughened surface 262 may be used alone; that is, without also including paint layer 268.

Figure 38:
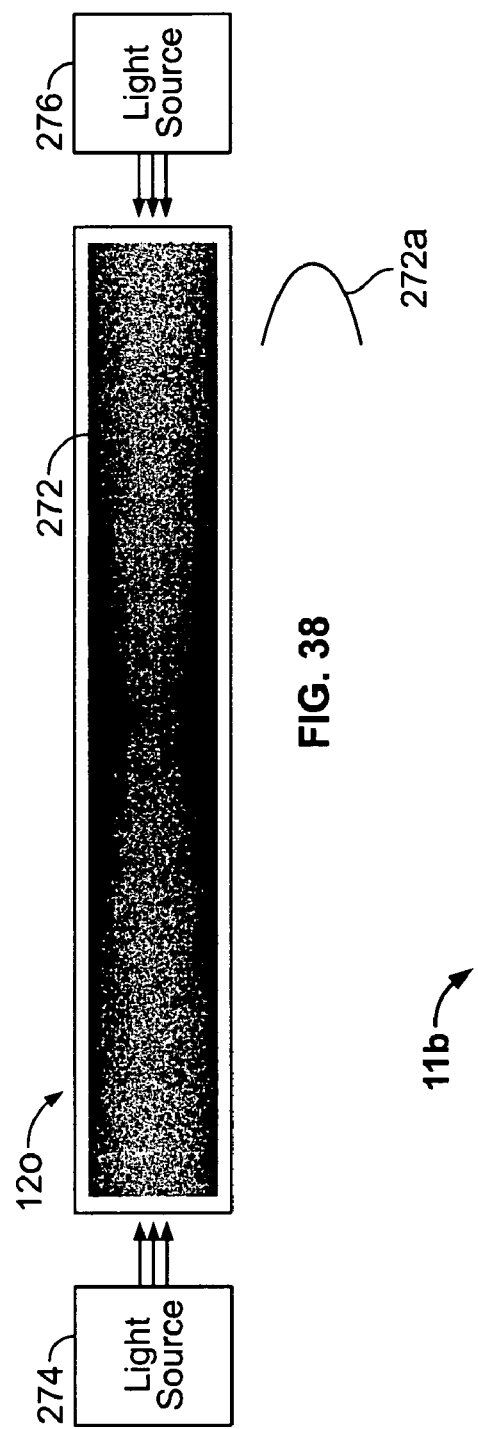
FIG. 38 is a top view, partially in block form, of a light pipe having a pattern of light-extraction means and having sources of light at both ends of the light pipe.

Concerning FIG. 38, whereas FIG. 1 shows a single light source 11 for providing light to a light pipe 12, FIG. 38 also shows a second light source. In particular, FIG. 38 shows a light pipe 12o having an exemplary light-extraction pattern 272, and having sources of light 274 and 276 at the ends of the light pipe. Pattern 272 has a smoothly curving lateral profile of efficiency of light extraction, similar to that shown in FIG. 11. For convenience, a similar profile 272a is shown in FIG. 38, but, similar to profile 170a of FIG. 28A, is rotated 90 degrees counterclockwise so as to directly associate with light-extraction pattern 272. Profile 272a is taken at the right end of pattern 272.

Another benefit of an aspect of the invention concerns the ability to tailor the light-extraction means to accommodate the different angular distributions of light from different light sources and still provide the same target illuminance. Referring back to FIG. 1, for instance, light source 11 may comprise a Light Emitting Diode (LED), a metal halide lamp, a halogen lamp, or other light sources with sufficiently high luminance to efficiently couple the light into the light pipe.

Figure 39:
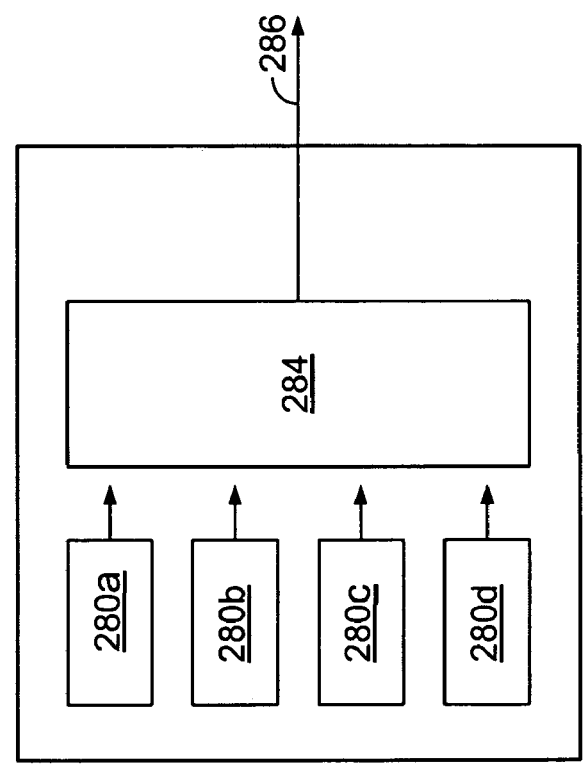
FIG. 39 is a block diagram of a light source comprising several component parts.

FIG. 39 shows a light source 11b, which may replace light source 11 of FIG. 1, by way of example. Light source 11b comprises multiple light sources, such as red, green and blue LEDs coupled into a single luminaire. LEDs 280a, 280b, 280c, and 280d form an array of different colors such as, respectively, red, green, green and blue. Light from each of the foregoing LEDs combined by a coupler 284 to produce a combined output 286. The foregoing arrangement is preferably embodied as shown in FIGS. 40A and 40B.

Figure 40A:
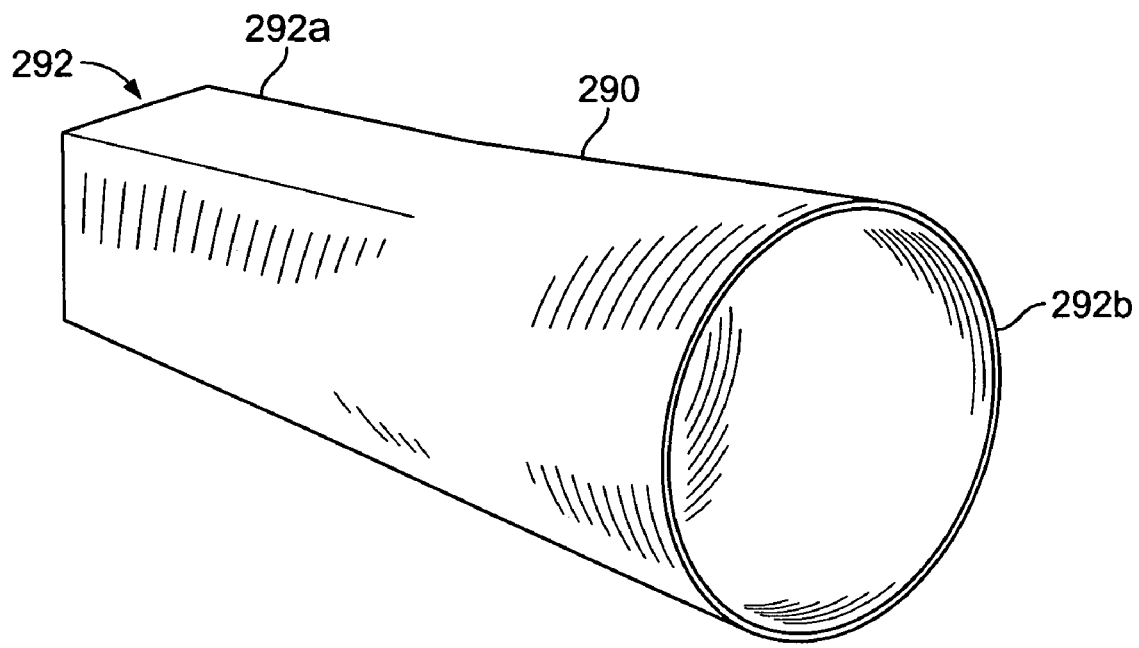
FIG. 40A is a perspective view of a preferred embodiment of the light source of FIG. 39.

FIG. 40A shows a coupler 290 and an array of LEDs 292. FIG. 40B shows an end view of coupler 290, with array 292 of FIG. 40A shown as separate component LEDs 292a, 292b, 292c, and 292d. Coupler 290 preferably is formed according to the principles of non-imaging optics. Coupler 290 preferably has the requisite shape for performing a so-called area-to-angle conversion, so that the angles of light propagating from the LEDs at a coupler inlet 292a, along the main optical axis of the coupler, become reduced at outlet 292b of the coupler. Coupler 290 may comprise a variant of a compound parabolic concentration, which uses specific, compound parabolic curves. Notably, inlet 292a of the coupler is substantially rectangular (e.g., rectangular or square), and outlet 292b is substantially round (e.g., round).

Figure 40B:
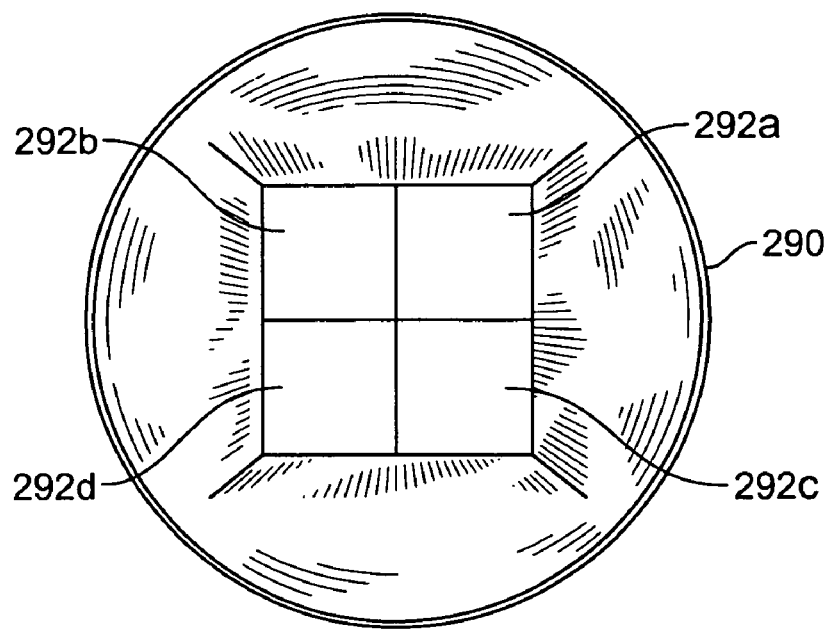
FIG. 40B is a front end view of that embodiment.

Concerning coupler 290 of FIGS. 40A and 40B, even if the angular distribution of light exiting the coupler shows color versus angle variations, a "luminaire" (as used herein) can provide an output distribution that is the average of the contribution from all the colored LEDs. This occurs because the light-extraction means scatter the light in the length direction and produce a smeared image of the paint pattern in a direction perpendicular to the luminaire. The non-imaging arrangement of FIGS. 40A and 40B result in color variations from the source being averaged to produce a beam pattern with very little color variation. If desired, a short length of light pipe lacking light-extraction means and preceding a luminaire can further ensure better mixing of colors.

The principles of color mixing mentioned in the foregoing paragraph also apply to lamps other than LEDs, such as metal halide lamps.

Another aspect of the invention concerns the adjustability of the light-extraction means described above to accommodate the angular distributions of light from each one of the light sources of a metal halide lamp, an LED lamp, or a halogen lamp, one at a time. In particular, the density of light-extraction means along the length of a light pipe (a secondary aspect of the present invention) can be adjusted to accommodate a metal halide lamp. Or, it can be adjusted to accommodate an LED lamp. Or, it can be adjusted to accommodate a halogen lamp. This feature of the invention beneficially allows a designer of a lighting arrangement to merely adjust the lengthwise density of the light-extraction means to accommodate different lamps, such as mentioned. For example, a light source with a higher angular distribution would typically use a larger change in extraction density along the light pipe length than one with a lower angular distribution.

More generally, the foregoing feature of the invention allows the light-extraction means to be adjusted to accommodate the angular distribution of light from a high illuminance light source. By high illuminance light source is meant a light source with luminance greater than 100,000 Nit, and more preferably with luminance greater than 1,000,000 Nit.

Finally, the foregoing adjustability feature can be put into effect by fabricating a luminaire with a design for accommodating a desired angular distribution of light, or the adjustment can take place after fabrication. For instance, adhesive stickers carrying light-extraction means can be added or removed by an installer of a luminaire.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A luminaire with improved lateral illuminance control, comprising:
    a) a light pipe with a longitudinal center;
    b) light-extraction means applied to a radial swath of the light pipe having a longitudinal portion with a dimension along the length of the light pipe that is centered about a slice of the light pipe; said slice being orthogonal to the longitudinal center, and being located in a propagation plane through which light propagates to a virtual target area that intersects the propagation plane; the light pipe intervening between the radial swath and the target area;
    c) a first average efficiency point of the light-extraction means in the radial swath corresponding to the minimum distance to the target area being at least approximately a predetermined percentage less than a respective, second average efficiency point of the light-extraction means in the radial swath corresponding to a respective maximum distance to the target area; the predetermined percentage being 20%; and
    d) the efficiency of the light-extraction means in the radial swath vanes from the first average efficiency point to the second average efficiency point though more than one non-zero value.

2. The luminaire of claim 1, wherein the predetermined percentage is 50%.

3. The luminaire of claim 1, wherein the predetermined percentage is 85%.

4. The luminaire of claim 1, wherein the minimum distance from the longitudinal center to the target area is less than the length of the light pipe extraction means.

5. The luminaire of claim 1, wherein the shape of the light pipe creates a blurred image of the extractor pattern.

6. The luminaire of claim 5, wherein the light pipe shape is round or elliptical.

7. The luminaire of claim 1, wherein the efficiency of the light-extraction means also varies along the length of the light pipe.

8. The luminaire of claim 1, wherein the efficiency of the light-extraction means in the radial swath varies from the first average efficiency point to the respective, second average efficiency point in a smooth manner, lacking discontinuities.

9. The luminaire of claim 7, wherein the efficiency of the light-extraction means in the radial swath varies from the first average efficiency point to the respective, second average efficiency point monotonically.

10. The luminaire of claim 1, wherein the efficiency of the light-extraction means in the radial swath varies from the first average efficiency point to the second average efficiency point in a stepwise manner.

11. The luminaire of claim 10, wherein the efficiency of the light-extraction means in the radial swath varies from the first average efficiency point to the respective, second average efficiency point monotonically.

12. The luminaire of claim 1, wherein the at least 90 percent of the intersecting region of the target area and the propagation plane lies on one side of a point of said region corresponding to said minimum distance.

13. The luminaire of claim 1, wherein the intersecting region of the target area and the propagation plane is divided, to within 15 percent of the dimension of said intersecting region, on each side of a point of said region corresponding to said minimum distance.

14. The luminaire of claim 1, wherein, along the length of the light pipe, the light-extraction means is disposed alternately, first, in a respective portion on a first radial side of the light-extraction means, and then, in a respective portion on a second radial side of the light-extraction means.

15. The luminaire of claim 14, wherein, along the length of the light pipe, proximally adjacent portions of the light-extraction means do not radially overlap each other.

16. The luminaire of claim 14, wherein, along the length of the light pipe, proximally adjacent portions of the light-extraction means radially overlap each other.

17. The luminaire of claim 1, wherein the efficiency of the light-extraction means varies along the radial swath in such manner as to result in substantially uniform illuminance along a corresponding lateral distribution of light reaching the target area.

18. The luminaire of claim 1, wherein the efficiency of the light extraction means at an angle θ in the radial swath corresponding to the angular difference, in the propagation plane, between the shortest path of light propagation to the target area and a desired path of light propagation to the target area second average efficiency point with respect to said longitudinal center is given by:

$$\text{Efficiency} = K \Big/ \cos^N\left[\theta \frac{\theta_{max}}{\theta_{max} + \theta_{oversize}}\right] + f(\theta)$$

wherein:
a) K is a constant;
b) $\theta_{max}$ is the angular difference, in the propagation plane, between the shortest path of light propagation to the target area and the longest path of light propagation to the target area;
c) $\theta_{oversize}$ is the angular difference, in the propagation plane, between the longest path of light propagation to the target area, and the longest path of light propagation to an overshoot region bordering the target area;
d) $f(\theta)$ is a balancing factor.

19. The luminaire of claim 18, wherein $f(\theta)$ is a swath of constant efficiency.

20. The luminaire of claim 18, wherein $f(\theta)$ is zero.

21. The luminaire of claim 18, wherein the average value of $f(\theta)$ is less than the average value of $$K \Big/ \cos^N\left[\theta \frac{\theta_{max}}{\theta_{max} + \theta_{oversize}}\right]$$

22. The luminaire of claim 18, wherein N vanes between the range of 1 and 4.

23. The luminaire of claim 22, wherein N is approximately 3.

24. The luminaire of claim 18, wherein $\theta_{oversize}$ is between 0 and 30 degrees.

25. The luminaire of claim 24, wherein $\theta_{oversize}$ is between approximately 10 and 15 degrees.

26. The luminaire of claim 18, wherein the efficiency of the light-extraction means also varies along the length of the light pipe.

27. The luminaire of claim 1, wherein the light-extraction means is adjustable to accommodate the angular distributions of light from each one of the light sources of a metal halide lamp, an LED lamp or a halogen lamp, one at a time.

28. The luminaire of claim 1, wherein the light-extraction means is adjustable to accommodate the angular distribution of light from a high illuminance light source with luminance greater than 100,000 Nit.

29. The luminaire of claim 28, wherein the light-extraction means is adjustable to accommodate the angular distribution of light from a high illuminance light source with luminance greater than 1,000,000 Nit.

30. The luminaire of claim 1, wherein the light-extraction means is adjustable to accommodate the angular distributions of light from an array of LED lamps having different colors.

31. The luminaire of claim 1, wherein the luminaire is placed inside of a freezer case and the source is placed outside of the freezer case.

32. A plurality of luminaires for collectively illuminating a common, virtual target area with improved lateral illuminance control, each luminaire comprising a light pipe having:
a) light-extraction means applied to a radial swath of the light pipe having a dimension along the length of the light pipe that is centered about a slice of the light pipe; said slice being orthogonal to the longitudinal center, and being located in a propagation plane through which light propagates to the virtual target area which intersects the propagation plane; the light pipe intervening between the radial swath and the target area;
b) a first average efficiency point of the light-extraction means in the radial swath corresponding to the minimum distance to the target area being at least approximately a predetermined percentage less than a respective, second average efficiency point of the light-extraction means in the radial swath corresponding to a respective maximum distance to the target area; the predetermined percentage being 20%; and
c) the efficiency of the light-extraction means in the radial swath varies from the first average efficiency point to the second average efficiency point though more than one non-zero value.

33. The luminaire of claim 32, wherein the predetermined percentage is 50%.

34. The luminaire of claim 32, wherein the predetermined percentage is 85%.

35. The arrangement of claim 32, wherein the plurality of luminaires consists of two luminaires.

36. The arrangement of claim 35, wherein the two luminaires are generally parallel to each other.

37. The luminaire of claim 32, wherein, for each light pipe:
a) the angular difference, in the propagation plane, between the shortest path of light propagation to the target area and the longest path of light propagation to the target area exceeds a coverage angle of 30 degrees; and
b) the efficiency of the light-extraction means varies along the radial swath in such manner as to result in substantially uniform illuminance along a corresponding swath of light reaching the target area.

38. The luminaire of claim 37, wherein the coverage angle is between 40 and 100 degrees.

39. The luminaire of 27, wherein the minimum distance from the longitudinal center of each light pipe to the target area is between about 10 cm and 30.5 cm.

40. The luminaire of claim 27, wherein the minimum distance from the longitudinal center of each light pipe to the target area is between about 10 cm and 14 cm.

41. The luminaire of 27, wherein the minimum distance from the longitudinal center of each light pipe to the target area is less than the length of the light pipe extraction means.

42. A luminaire, with improved lateral illuminance control, comprising:
   a) a light pipe with a longitudinal center;
   b) a plurality of separate light-extraction swath patterns for respectively illuminating different target areas; at least one swath pattern comprising:
      i) light-extraction means applied to a radial swath of the light pipe having a dimension along the length of the light pipe that is centered about a slice of the light pipe; said slice being orthogonal to the longitudinal center, and being located in a propagation plane through which light propagates to a virtual target area that intersects the propagation plane; the light pipe intervening between the radial swath and the target area;
      ii) a first average efficiency point of the light-extraction means in the radial swath corresponding to the minimum distance to the target area being at least approximately a predetermined percentage less than a respective, second average efficiency point of the light-extraction means in the radial swath corresponding to a respective maximum distance to the target area; the predetermined percentage being 20%; and
      iii) the efficiency of the light-extraction means in the radial swath varies from the first average efficiency point to the second average efficiency point though more than one non-zero value.

43. The luminaire of claim 42, wherein the predetermined percentage is 50%.

44. The luminaire of claim 42, wherein the predetermined percentage is 85%.

45. The luminaire of claim 42, where the light pipe contains only two swath patterns.

* * * * *

UNITED STATES PATENT AND TRADEMARK OFFICE
CERTIFICATE OF CORRECTION

PATENT NO. : 7,374,313 B2
APPLICATION NO. : 11/366711
DATED : May 20, 2008
INVENTOR(S) : Cassarly et al.

It is certified that error appears in the above-identified patent and that said Letters Patent is hereby corrected as shown below:

Column 1, after line 2 insert:

GOVERNMENT INTEREST

This invention was made with Government support under Agreement Number DAAH01-03-9-R001 awarded by the U.S. Army Aviation and Missile Command. The Government has certain rights in the invention.

Signed and Sealed this

Twenty-sixth Day of August, 2008

JON W. DUDAS
*Director of the United States Patent and Trademark Office*